US011706070B1

(12) United States Patent
Saggar et al.

(10) Patent No.: US 11,706,070 B1
(45) Date of Patent: Jul. 18, 2023

(54) SLOT ALIGNMENT BETWEEN CYCLIC-PREFIX-BASED WAVEFORMS AND GUARD-INTERVAL-BASED WAVEFORMS

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/656,389

(22) Filed: Mar. 24, 2022

(51) Int. Cl.
*H04L 27/26* (2006.01)
(52) U.S. Cl.
CPC .................. *H04L 27/2607* (2013.01)
(58) Field of Classification Search
CPC .................................................. H04L 27/2607
See application file for complete search history.

(56) References Cited

U.S. PATENT DOCUMENTS

| 2020/0067748 A1* | 2/2020 | Zhang | H04W 16/28 |
| 2022/0417935 A1* | 12/2022 | Sakhnini | H04L 27/2602 |
| 2023/0028826 A1* | 1/2023 | Zhang | H04L 27/2607 |

* cited by examiner

*Primary Examiner* — Sung S Ahn
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot is associated with one of an extra portion, a truncated portion, or a removed portion such that a boundary of the first GI slot aligns with a boundary of a first CP slot. The UE may transmit or receive a first message in the half subframe via the GI-based waveform using the first GI slot. Numerous other aspects are described.

30 Claims, 13 Drawing Sheets

SLOT ALIGNMENT BETWEEN CYCLIC-PREFIX-BASED WAVEFORMS AND GUARD-INTERVAL-BASED WAVEFORMS

FIELD OF THE DISCLOSURE

Aspects of the present disclosure generally relate to wireless communication and to techniques and apparatuses for slot alignment between cyclic-prefix-based waveforms and guard-interval-based waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The method may include transmitting or receiving a first message in the half subframe via the GI-based waveform using the first GI slot.

Some aspects described herein relate to a method of wireless communication performed by a network entity. The method may include transmitting, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The method may include transmitting or receiving a first message in the half subframe via the GI-based waveform using the first GI slot.

Some aspects described herein relate to an apparatus for wireless communication at a UE. The apparatus may include a memory and one or more processors coupled to the memory. The one or more processors may be configured to receive, from a network entity, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The one or more processors may be configured to transmit or receive a first message in the half subframe via the GI-based waveform using the first GI slot.

Some aspects described herein relate to an apparatus for wireless communication at s network entity. The apparatus may include a memory and one or more processors coupled to the memory. The one or more processors may be configured to transmit, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The one or more processors may be configured to transmit or receive a first message in the half subframe via the GI-based waveform using the first GI slot.

Some aspects described herein relate to a non-transitory computer-readable medium that stores a set of instructions for wireless communication by a UE. The set of instructions, when executed by one or more processors of the UE, may cause the UE to receive, from a network entity, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The set of instructions, when executed by one or more processors of the UE, may cause the UE to transmit or receive a first message in the half subframe via the GI-based waveform using the first GI slot.

Some aspects described herein relate to a non-transitory computer-readable medium that stores a set of instructions for wireless communication by a network entity. The set of instructions, when executed by one or more processors of the network entity, may cause the network entity to transmit, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The set of instructions, when executed by one or more processors of the network entity, may cause the network entity to transmit or receive a first message in the half subframe via the GI-based waveform using the first GI slot.

Some aspects described herein relate to an apparatus for wireless communication. The apparatus may include means for receiving, from a network entity, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The apparatus may include means for transmitting or receiving a first message in the half subframe via the GI-based waveform using the first GI slot.

Some aspects described herein relate to an apparatus for wireless communication. The apparatus may include means for transmitting, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The apparatus may include means for transmitting or receiving a first message in the half subframe via the GI-based waveform using the first GI slot.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
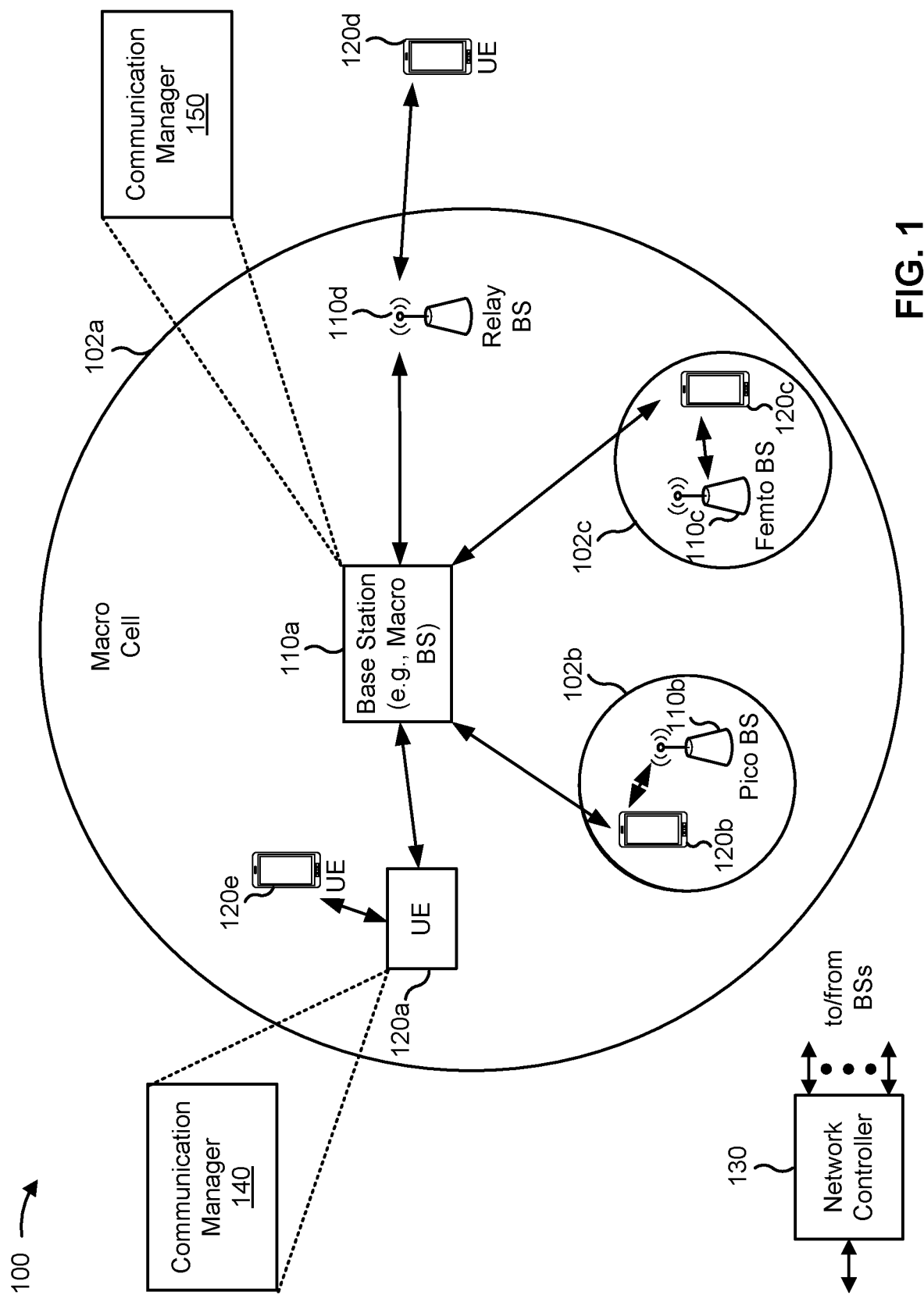
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR2-2, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and transmit or receive a first message in the half subframe via the GI-based waveform using the first GI slot. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and transmit or receive a first message in the half subframe via the GI-based waveform using the first GI slot. Additionally, or alternatively, the communication manager 150 may perform one or more other operations described herein.

As indicated above, FIG. 1 is provided as an example. Other examples may differ from what is described with regard to FIG. 1.

Figure 2:
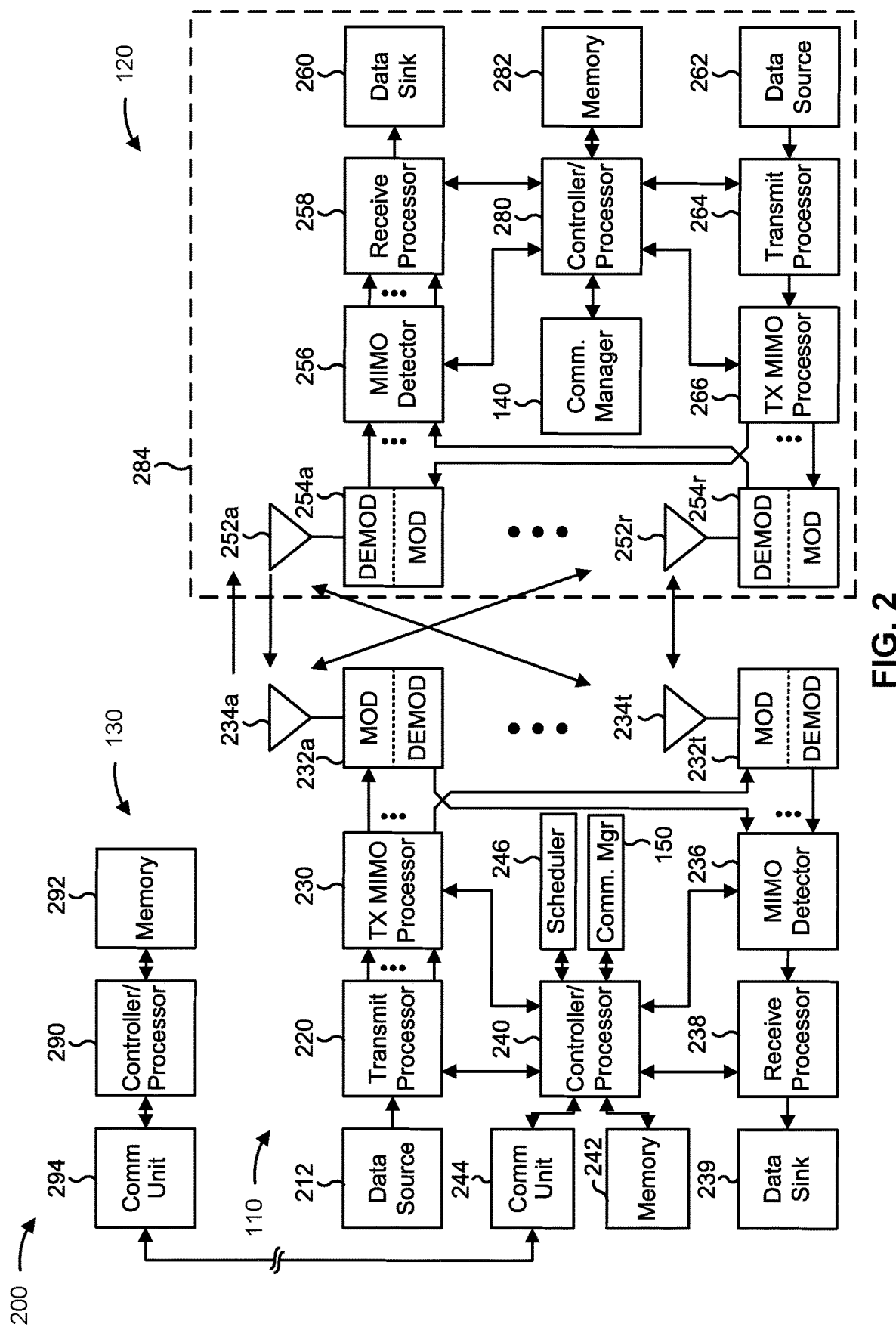
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-13).

The controller/processor 240 of the base station 110, the controller/processor 280 of the UE 120, and/or any other component(s) of FIG. 2 may perform one or more techniques associated with slot alignment between cyclic-prefix-based waveforms and guard-interval-based waveforms, as described in more detail elsewhere herein. In some aspects, the network entity described herein (e.g., network entity 605 described below in connection with FIG. 6) is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and/or means for transmitting or receiving a first message in the half subframe via the GI-based waveform using the first GI slot. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and/or means for transmitting or receiving a first message in the half subframe via the GI-based waveform using the first GI slot. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
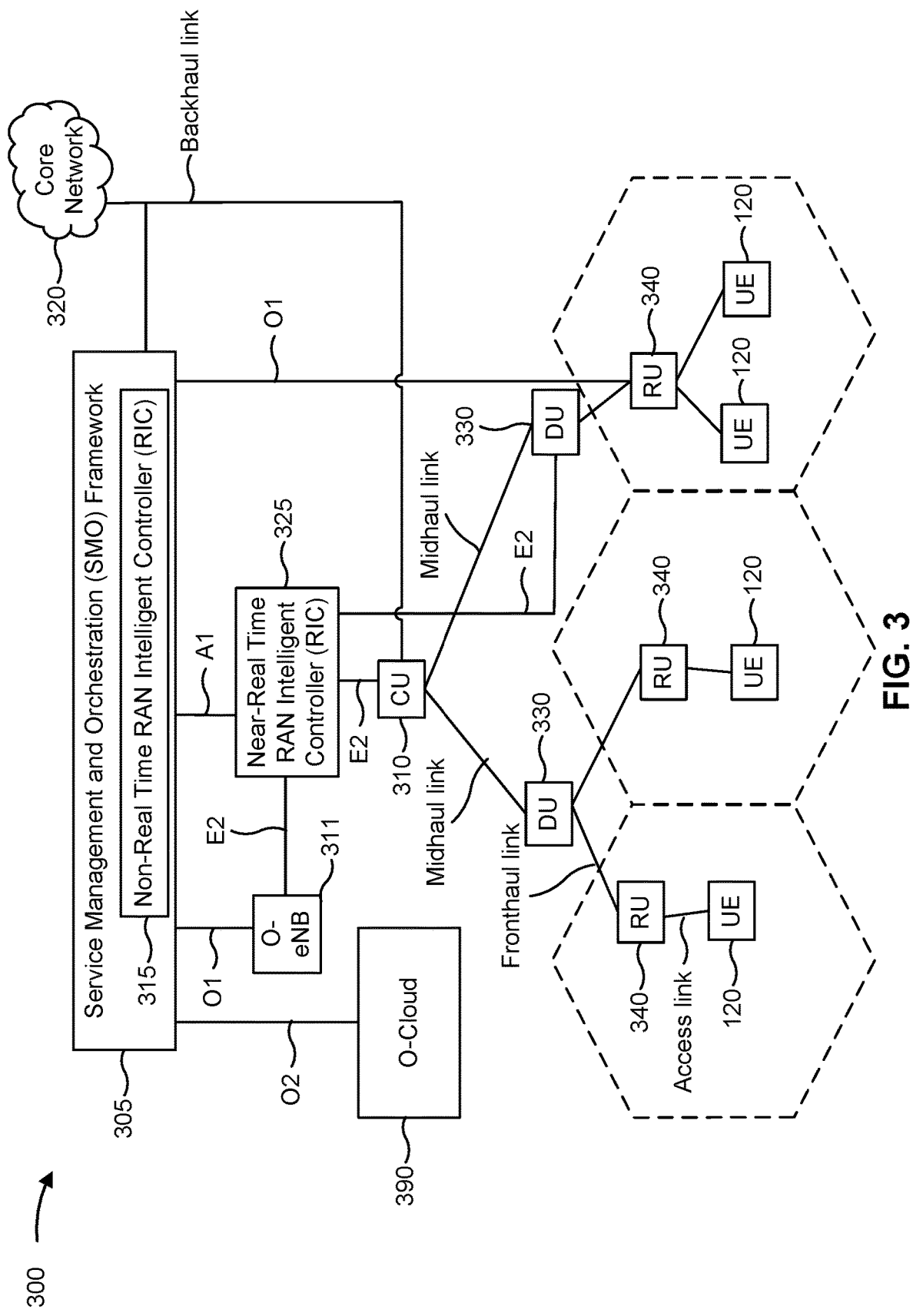
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

"Network entity" or "network node" can refer to a disaggregated base station, or to one or more units of a disaggregated base station (such as one or more CUs, one or more DUs, one or more RUs, or a combination thereof). "Network entity" or "network node" can refer to a disaggregated base station, or to one or more units of a disaggregated base station (such as one or more CUs, one or more DUs, one or more RUs, or a combination thereof).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
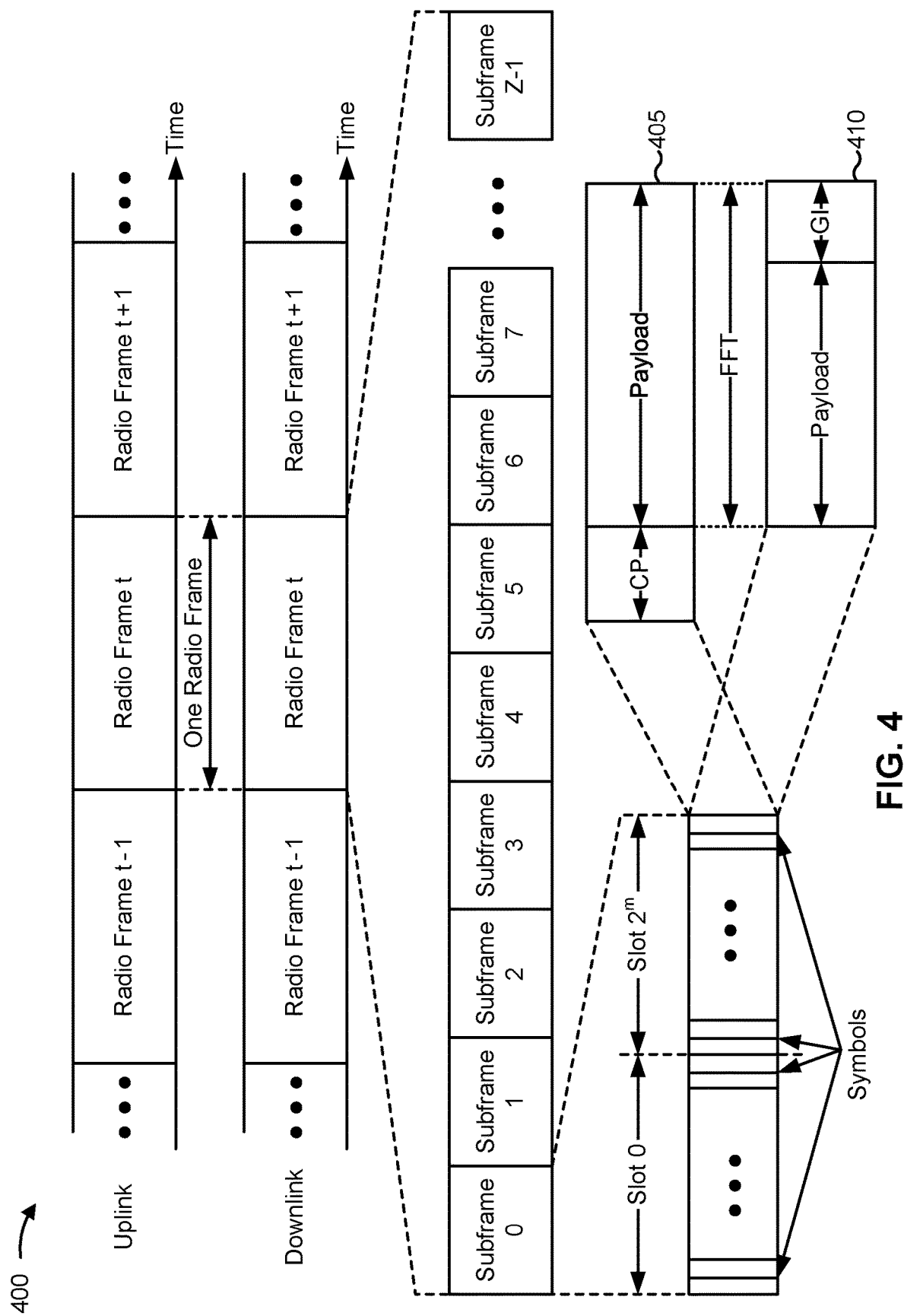
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^\mu$ slots per subframe are shown in FIG. 4, where p is an index of a numerology used for a transmission, such as 0, 1, 2, 3, 4, or another number). Each slot may include a set of L symbols. For example, each slot may include fifteen symbols (e.g., for a GI-based waveform), fourteen symbols (e.g., for a CP-based waveform with symbols including a normal CP (NCP)), twelve symbols (e.g., for a CP-based waveform with symbols including an extended CP (ECP)) seven symbols, or another number of symbols. In a case where the subframe includes two slots (e.g., when μ=1), the subframe may include 2L symbols, where the 2L symbol periods in each subframe may be assigned indices of 0 through 2L−1. In some aspects, a scheduling unit for the FDD may be frame-based, subframe-based, slot-based, mini-slot based, or symbol-based.

In some aspects, as shown by reference number 405, the frame structure may be associated with the CP-based waveform. For the CP-based waveform, each symbol may include a payload and a CP. The CP is transmitted at the start of each symbol to provide protection against inter-symbol interference caused by a delay spread as a result of wave propagation, among other reasons. The CP includes a copy of an end portion of the payload belonging to the corresponding symbol, and acts as a guard period between adjacent symbols, providing a time window for the delay spread components belonging to a previous symbol to arrive before the start of the next symbol's payload.

For the CP-based waveform, a time duration of the payload is equal to one cycle of a sine wave with a frequency equal to the subcarrier spacing (SCS). Put another way, in terms of sample size, the payload of the CP symbol has a length of FFT samples, and thus a length of the CP symbol as a whole is equal to FFT samples plus a number of samples included in the CP. The length of the CP (and thus the number of samples within the CP) may vary according to implementation and/or a location of the corresponding symbol within a slot. For example, while most SCSs implement an NCP, certain SCSs (e.g., 60 kHz) may optionally include an ECP having a longer duration than the NCP. Moreover, for the NCP aspects, certain symbols within a subframe (sometimes referred to as long symbols) may include a longer NCP (e.g., may include an NCP plus some additional padding) to ensure that there is an integer number of symbols within each half subframe (e.g., within each 0.5 ms time window). In some embodiments, there is one long symbol per every half subframe. More particularly, for CP-based waveforms utilizing the NCP, each long symbol may occur at the first symbol and at the $7*2^\mu$-th symbol in a slot (e.g., at the first and seventh symbols for 15 kHz SCS, the first and the fourteenth symbols for 30 kHz SCS, the first and 28th symbols for 60 kHz SCS, the first and 56th symbols for 120 kHz SCS, the first and 112th symbols for 240 kHz SCS, and so forth). Put another way, for CP-base waveforms, the size of the slots in a subframe may be of unequal length, with one slot in each half subframe, which includes the long symbol (e.g., which includes an NCP plus padding), being of greater duration than the remaining slots in the half subframe. In some aspects, a slot of a CP-based waveform utilizing the NCP contains fourteen symbols, while a slot of a CP-based waveform utilizing the ECP contains twelve symbols.

In some aspects, and as shown by reference number 410, the frame structure may be associated with a GI-based waveform. For the GI-based waveform, each symbol may include a payload portion and a GI portion. The GI portion may be transmitted at the start or end of each symbol, and, in a similar manner as the CP, may provide protection against inter-symbol interference caused by a delay spread as a result of wave propagation, among other reasons. However, unlike the CP, the GI may not include a copy of a portion of the payload belonging to the corresponding symbol. Instead, the GI may be blank and/or may include all zero information bits (and thus be useful, in addition to serving as a guard between successive payloads, for measuring noise in the channel or the like), and/or may include reference signaling or other non-payload signaling.

Moreover, and unlike the CP-based waveform, for the GI-based waveform, a time duration of the GI symbol as a whole is equal to one cycle of a sine wave with a frequency equal to the SCS. That is, in terms of sample size, the entire GI symbol (e.g., payload plus GI) has a length of FFT samples. In this regard, a slot associated with the GI-based waveform may contain more symbols than a slot associated with a CP-based waveform. More particularly, in some aspects, a slot associated with a GI-based waveform may include fifteen symbols. As a result, within a given half subframe, slot boundaries for CP-based waveforms may not align with slot boundaries for GI-based waveforms, which will be described in more detail in connection with FIG. 5.

As indicated above, FIG. 4 is provided as an example. Other examples may differ from what is described with respect to FIG. 4.

Figure 5:
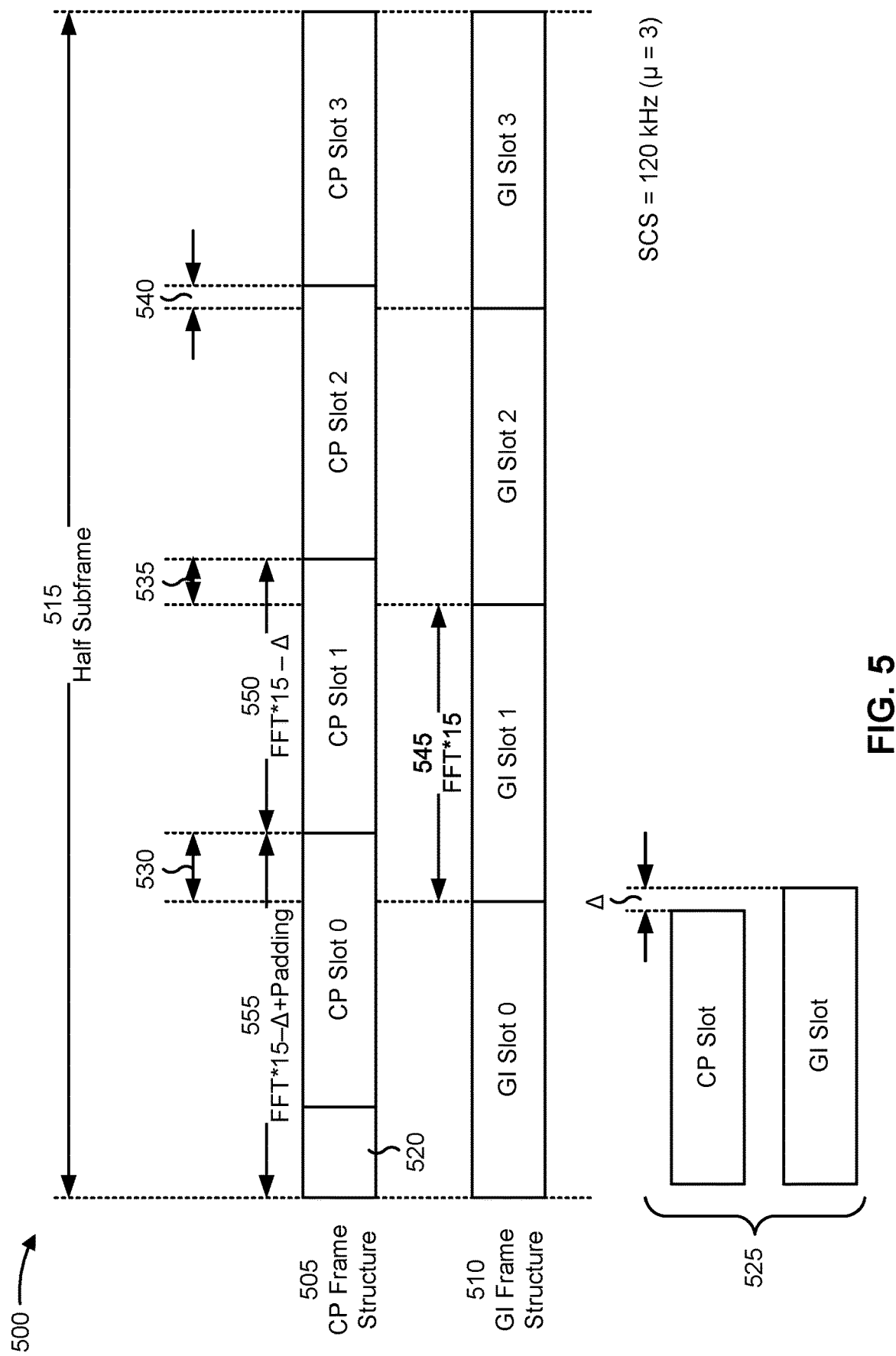
FIG. 5 is a diagram illustrating an example of a cyclic prefix (CP) frame structure and a guard interval (GI) frame structure, in accordance with the present disclosure.

FIG. 5 is a diagram illustrating an example 500 of a CP frame structure 505 and a GI frame structure 510, in accordance with the present disclosure. The example 500 shown in FIG. 5 corresponds to a frame structure associated with a 120 kHz SCS (e.g., μ=3), which includes eight slots per subframe, or four slots per half subframe 515, as depicted in FIG. 5. Aspects of the disclosure are not so limited, however, and, in some other aspects, different SCSs including a different number of slots per subframe (more particularly, $2^\mu$ slots per subframe, or $½*2^\mu$ slots per half subframe) may be employed without departing from the scope of the disclosure.

As described in connection with FIG. 4, the CP frame structure 505 includes unequal-length slots. More particularly, for the half subframe 515 of the 120 kHz SCS example shown in FIG. 5, the CP frame structure 505 includes one long CP slot (e.g., CP slot 0) and three normal CP slots (e.g., CP slot 1, CP slot 2, and CP slot 3). More particularly, the long CP slot (e.g., CP slot 0) includes padding 520 such that an integer number of CP slots are provided in the half subframe 515 (e.g., for the 120 kHz SCS example, four CP slots are provided in the half subframe 515). In contrast, the GI frame structure 510 includes equal-length slots. More particularly, for the half subframe 515 of the 120 kHz SCS example shown in FIG. 5, the GI frame structure 510 includes four, equal-length GP slots (e.g., GI slot 0, GI slot 1, GI slot 2, and GI slot 3).

In that regard, each normal CP slot is shorter, in a time duration, than each GI slot (e.g., each normal CP slot is shorter by a distance of A than each respective GI slot, as shown by reference number 525), while the long CP slot is longer (due to the presence of the padding 520), in the time domain, than each GI slot (e.g., the long CP slot is longer by a length of the padding minus Δ than each respective GI slot). As a result, slot boundaries of respective CP and GI slots align only every half subframe. More particularly, while start boundaries of the CP slot 0 and the GI slot 0 are aligned, end boundaries of the CP slot 0 and the GI slot 0 are offset a first offset distance 530 (e.g., an end boundary of the CP slot 0 occurs later-in-time than an end boundary of the GI slot 0). As a result, start boundaries of the CP slot 1 and the GI slot 1 are offset the first offset distance 530. Similarly, end boundaries of the CP slot 1 and the GI slot 1 are misaligned, but, because each normal CP slot is shorter by a distance of Δ than each GI slot, the end boundaries of CP slot 1 and the GI slot 1 are offset a second offset distance 535, which is shorter than the first offset distance 530. More particularly, the second offset distance 535 is equal to the first offset distance 530 minus Δ. Similarly, end boundaries of the CP slot 2 and the GI slot 2 are offset a third offset distance 540, which is shorter than the first offset distance 530 and the second offset distance 535 (e.g., the third offset distance 540 is equal to the first offset distance 530 minus $2*\Delta$ and is equal to the second offset distance 535 minus Δ). In this way, end boundaries of the CP slot 3 and the CP slot 3 are aligned (e.g., boundaries of the CP slots and GI slots are aligned every half subframe 515).

In terms of sample size, and as described in connection with FIG. 4, each GI slot includes fifteen symbols and thus has a length of FFT*15 samples long, as shown by reference number 545. Because each CP slot contains fourteen CP-OFDM symbols and is shorter than each GI slot by a length of A, as described, each normal CP slot thus has a length of FFT*15−Δ samples long, as shown by reference number 550, while the long CP slot has a length of FFT*15−Δ+a length of the padding 520 samples long, as shown by reference number 555. For the 120 kHz aspects, in which there are four slots per half subframe 515, the length of the padding 520 is equal to 4*Δ samples long (to compensate for shorter length of each of the four CP slots in the half subframe 515), and a length of the long CP slot is thus equal to FFT*15−Δ+4*Δ samples long (e.g., FFT*15+3*Δ samples long). In other aspects, a length of the padding 520 may differ (e.g., a length of the padding may be Δ for 15 kHz, 2*Δ for 30 kHz, 3*Δ for 60 kHz, 5*Δ for 240 kHz, and so forth), and thus a length of the long CP slot will similarly differ (e.g., a length of the long CP slot may be FFT*15 for 15 kHz, FFT*15+Δ for 30 kHz, FFT*15+2*Δ for 60 kHz, FFT*15+4*Δ for 240 kHz, and so forth). More generally, for a given numerology value μ, a length of the padding 520 is $½*2^\mu*\Delta$, and a length of the long CP slot is FFT*15−Δ+$½*2^\mu*\Delta$.

In some aspects, the length, in the time domain, of a CP is proportional to a CP length parameter, $N_{CP,l}^\mu$, with l referring to the symbol index. $N_{CP,l}^\mu$ is defined as: $512\kappa 2^{-\mu}$ for the extended CP (with κ being a constant equal to 64); $144\kappa 2^{-\mu}+16\kappa$ for the long CP symbol (e.g., when l=0 or l=$7*2^\mu$); and $144\kappa 2^{-\mu}$ for the normal CP symbols (e.g., when l≠0 or l≠$7*2^\mu$). To convert $N_{CP,l}^\mu$ to sample length for a given SCS with a FFT size of 4096 samples, $N_{CP,l}^\mu$ is multiplied by $2^{(\mu-5)}$. More particularly, the basic time unit for 5G is $T_c$, which is equal to $1/(\Delta f_{max}*N_f)$, with $\Delta f_{max}$=480 KHz and $N_f$=4096. Put another way, $T_c$=1/(480 KHz*4096), which is equivalent to 1/(15 KHz*$2^5$*4096). Moreover, per the applicable wireless communication standards, $T_{CP}$=$N_{CP,l}^\mu T_c$, where $T_{CP}$ is the time duration for the CP. Moreover, $T_{CP}$ can be represented in terms of sample time of an SCS, Δf=$2^\mu$*15 KHz, as $T_S$=1/(Δf*4096). Accordingly, $T_C/T_S$=(1/(15 KHz*$2^5$*4096))/(1/(15 KHz*$2^\mu$*4096))=$2^{(\mu-5)}$, meaning that to convert $N_{CP,l}^\mu$ to sample length for a given SCS with a FFT size of 4096 samples, $N_{CP,l}^\mu$ is multiplied by $2^{(\mu-5)}$.

Thus, a length of a normal CP symbol is 4096 samples (corresponding to the payload)+$144\kappa 2^{-\mu}*2^{(\mu-5)}$ (e.g., $144\kappa 2^{-5}$) samples (corresponding to the CP). For the 120 kHz example shown in FIG. 5, the length of a normal CP slot, as shown by reference number 545, is thus 14 symbols*(4096+$144*64*2^{-5}$ samples/symbol)=14 symbols*(4096+288)=61,376 samples, and the length of the GI slot, as shown by reference number 550, is equal to 15 symbols*(4096 samples/symbol)=61,440 samples. Thus, for the depicted 120 kHz example, Δ=64 samples (e.g., 61,440−61,376 samples), which means that the padding 520 has a length of 256 samples (e.g., 4*64 samples), the first offset distance 530 has a length of 192 samples (e.g., 3*64 samples), the second offset distance 535 has a length of 128 samples (e.g., 2*64 samples), and third offset distance 540 has a length of 64 samples (e.g., 1*64 samples). In other aspects, for different SCSs and/or different FFT lengths, the length of the padding 520 and/or the length and number of the offsets may differ without departing from the scope of the disclosure. For example, although the maximum misalignment between the CP slots and the GI slots in the depicted example is 192 samples (corresponding to the first offset distance 530), in other aspects the maximum misalignment may be, for a FFT length of 4096 samples, $(2^{(\mu-5)}-1)*64$ samples, and thus 64 samples for a 60 kHz SCS, 448 samples for a 240 kHz SCS, 960 samples for a 480 kHz SCS, 1984 samples for a 960 kHz SCS, and so forth.

In some aspects, it may be beneficial to transmit and/or receive communications using the CP-based waveform, while in some other aspects it may be beneficial to transmit and/or receive communications using a GI-based waveform. For example, a length of the GI can vary and is configurable, and thus GI-based waveform communications may be beneficial for use in higher frequency bands (e.g., FR4, FR5, and the like) when a longer or shorter guard period than a CP is desired due to channel conditions, application type, or the like. For example, for channels experiencing delay spread longer than a CP, it may be beneficial to communicate using the GI-based waveform with a length of the GI configured as greater than a length of the CP, thereby reducing inter-symbol interference. However, when there is no desire to adjust a length of guard portion and/or use of the GI-based waveform is otherwise unnecessary, and/or when communicating with a network device incapable of transmitting or receiving in the GI-based waveform, it may be desirable to communicate using the CP-based waveform. But because, as described above, there is no slot level alignment between the CP slots and the GI slots (e.g., the CP slots and GI slots are aligned only every half subframe), a network entity (e.g., a base station, a CU 310, a DU 330, an RU 340, or the like) and/or a UE (e.g., the UE 120) cannot easily switch transmissions between a CP-based waveform and a GI-based waveform. Thus, a network entity and/or UE must use either the CP-base waveform or the GI-based waveform within a half subframe, leading to reduced flexibility and network efficiency, increased interference, channel degradation, and overall increased latency and decreased throughput.

Some techniques and apparatuses described herein enable slot alignment between CP slots and GI slots, thereby permitting switching between CP-based waveform communications and GI-based waveform communications. For example, in some aspects a UE (e.g., UE 120) may receive from a network entity (e.g., a base station 110, a CU 310, a DU 330, an RU 340, or a similar network entity) a configuration of CP frame structure associated with a CP-based waveform and a GI frame structure associated with a GI-based waveform. The GI frame structure may include at least one GI slot that includes one of an extra portion, a truncated portion, or a removed portion such that a boundary of the GI slot aligns with a boundary of one CP slot of the CP frame structure. In some aspects, a first-in-time GI slot may include an extra portion such that the first-in-time GI slot's boundary aligns with a boundary of a long CP slot (e.g., a slot including a symbol having a long NCP), while a second-in-time GI slot may include a truncated portion such that a boundary of the second-in-time GI slot aligns with a boundary of a normal CP slot (e.g., a slot that does not include a symbol having a long NCP). In some other aspects, multiple adjacent GI slots may not include any extra portion or truncated portion, and the one of the extra portion, the truncated portion, or the removed portion is included in a GI slot at a point in the GI frame structure where the UE switches from a GI-based waveform to a CP-based waveform or from a CP-based waveform to a GI-based waveform, such that a boundary of a GI slot at the point of switchover aligns with a boundary of the CP-slot at the point of switchover. Thus, aspects of the disclosure enable a slot structure for a GI-based waveform to align with a slot structure for a CP-based waveform, resulting in increased flexibility and network efficiency, decreased inter-symbol interference or the like, improved channel quality, and overall decreased latency and increased throughput.

As indicated above, FIG. 5 is provided as an example. Other examples may differ from what is described with respect to FIG. 5.

Figure 6:
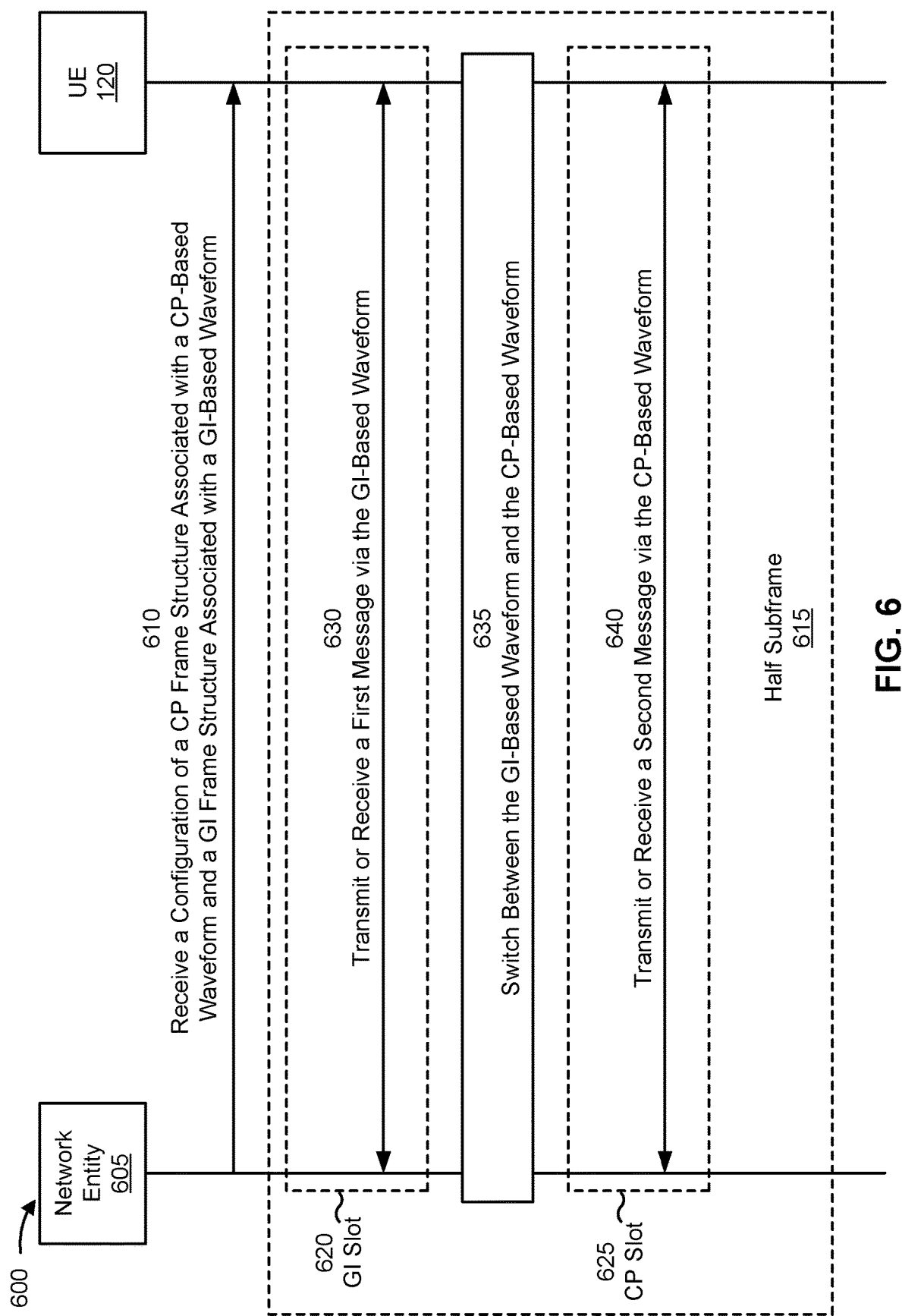
FIGS. 6-9 are diagrams illustrating examples associated with slot alignment between CP-based waveforms and GI-based waveforms, in accordance with the present disclosure.

FIG. 6 is a diagram illustrating an example 600 associated with slot alignment between CP-based waveforms and GI-based waveforms, in accordance with the present disclosure. As shown in FIG. 6, a network entity 605 and a UE 120 may communicate with one another.

As shown by reference number 610, the UE 120 may receive, from the network entity 605, a configuration of a CP frame structure associated with a CP-based waveform and a GI frame structure associated with a GI-based waveform. In some aspects, the CP frame structure may include multiple CP slots arranged in a half subframe 615. Similarly, the GI frame structure includes multiple GI slots arranged in the half subframe 615. In some aspects, a first GI slot 620, of the multiple GI slots, is associated with one of an extra portion, a truncated portion, or a removed portion such that a boundary of the first GI slot 620 aligns with a boundary of a first CP slot 625, of the multiple CP slots.

More particularly, as described in more detail below in connection with FIG. 7, the first GI slot 620 may be a first-in-time GI slot in the half subframe 615 that is associated with an extended portion such that an end boundary of the first-in-time GI slot aligns with an end boundary of the first CP slot 625 (which, in such aspects, may be a first-in-time CP slot). Put another way, the first-in-time GI slot may be associated with an extended portion to compensate for the first offset distance 530 described in connection with FIG. 5. In some other aspects, the first GI slot 620 may be a second-in-time or later GI slot in the half subframe 615 that is associated with one of a truncated portion or a removed portion such that an end boundary of the second-in-time or later GI slot aligns with an end boundary of the first CP slot 625 (which, in such aspects, may be a second-in-time or later CP slot). Put another way, in some aspects, the first GI slot 620 may be a second-in-time or later GI slot that is associated with one of a truncated portion or a removed portion in order to compensate for the difference in slot lengths (e.g., A, as described in connection with FIG. 5) between the GI slots and the CP slots.

In some other aspects, and as described in more detail below in connection with FIGS. 8 and 9, the first GI slot 620 may be a GI slot located at a portion of the half subframe 615 where the UE 120 and/or the network entity 605 switches between GI-based waveform communications and CP-based waveform communications. In such aspects, the first GI slot 620 may be associated with the one of the extra portion, the truncated portion, or the removed portion in order to align slot boundaries of the first GI slot 620 and the first CP slot 625 at the point of switchover. For example, when switching from GI-based waveform communications to CP-based waveform communications, the first GI slot 620 may be associated with an extra portion such that an end boundary of the first GI slot 620 aligns with a start boundary the first CP slot 625. Put another way, when switching from GI-based waveform communications to CP-based waveform communications, the first GI slot 620 may be associated with an extra portion in order to compensate for an offset distance (e.g., one of the first offset distance 530, the second offset distance 535, the third offset distance 540, or the like) at the point of switchover. Similarly, when switching from CP-based waveform communications to GI-based waveform communications, the first GI slot 620 may be associated with one of a truncated portion or a removed portion such that a start boundary of the first GI slot 620 aligns with end boundary of the first CP slot 625. Put another way, when switching from CP-based waveform communications to GI-based waveform communications, the first GI slot 620 may be associated with one of a truncated portion or a removed portion in order to compensate for an offset distance (e.g., one of the first offset distance 530, the second offset distance 535, the third offset distance 540, or the like) at the point of switchover.

As shown by reference number 630, in some aspects, the UE 120 may transmit or receive a first message in the half subframe 615 via the GI-based waveform using the first GI slot 620. As described in connection with reference number 410 of FIG. 4, transmitting or receiving the first message in the half subframe 615 via the GI-based waveform using the first GI slot 620 may include transmitting or receiving the first message in a slot containing symbols in which a payload portion is shorter than one cycle of a sine wave with a frequency equal to the SCS (e.g., in terms of sample size, the payload portion has a length shorter than FFT samples), with a GI occupying the remainder of the slot (e.g., the GI occupies the portion of the FFT samples not occupied by the payload).

As shown by reference number 635, in some aspects the UE 120 and/or the network entity 605 may switch between GI-based waveform communications and CP-based waveform communications. In some aspects, such a switch may be triggered by signaling from one of the network entity 605 or the UE 120. For example, due to a change in channel conditions, an application type of data to be sent, or for other reasons, the network entity 605 may initiate a change between the GI-based waveform communications and the CP-based waveform communications. In some aspects, the network entity 605 may signal the change between the GI-based waveform communications and the CP-based waveform communications using a downlink control information (DCI) message, a MAC control element (MAC-CE) message, or the like. As described above in connection with reference number 630, and as described in more detail below in connection with FIG. 8, in some aspects, when switching from the GI-based waveform communication to the CP-based waveform communication, the first GI slot 620 may correspond to a GI slot at the point of switching and be associated with an extra portion. That is, when switching from the GI-based waveform to the CP-based waveform, the first GI slot 620 may be associated with the extra portion in order to compensate for an offset distance (e.g., one of the first offset distance 530, the second offset distance 535, the third offset distance 540, or the like) at the point of switchover.

As shown by reference number 640, in some aspects, the UE 120 and/or the network entity 605 may transmit or receive a second message in the half subframe 615 via the CP-based waveform using the first CP slot 625. As described in connection with reference number 405 of FIG. 4, transmitting or receiving the second message in the half subframe 615 via the CP-based waveform using the first CP slot 625 may include transmitting or receiving the first message in a slot containing symbols in which a length of a payload portion is equal to one cycle of a sine wave with a frequency equal to the SCS (e.g., in terms of sample size, the payload portion has a length equal to FFT samples), with a CP portion occupying samples in addition to the FFT samples.

Although, for ease of description, the first message is shown and described as occurring prior in time to the second message, aspects of the disclosure are not so limited. For example, in some other aspects, the second message may be transmitted or received prior in time to the first message (e.g., the UE 120 and/or the network entity 605 may first communicate using the CP-based waveform and then switch to communicating using the GI-based waveform). As described in more detail below in connection with FIG. 8, in some aspects, when switching from the CP-based waveform communication to the GI-based waveform communication (e.g., when the second message is transmitted or received prior in time to the first message), the first GI slot 620 may correspond to a GI slot at the point of switchover and may be associated with one of a truncated portion or a removed portion. More particularly, when switching from the CP-based waveform to the GI-based waveform (e.g., when the second message is transmitted or received prior-in-time to the first message), the first GI slot 620 may be associated with the one of the truncated portion or the removed portion in order to compensate for an offset distance (e.g., one of the first offset distance 530, the second offset distance 535, the third offset distance 540, or the like) at the point of switchover.

As indicated above, FIG. 6 is provided as an example. Other examples may differ from what is described with respect to FIG. 6.

Figure 7:
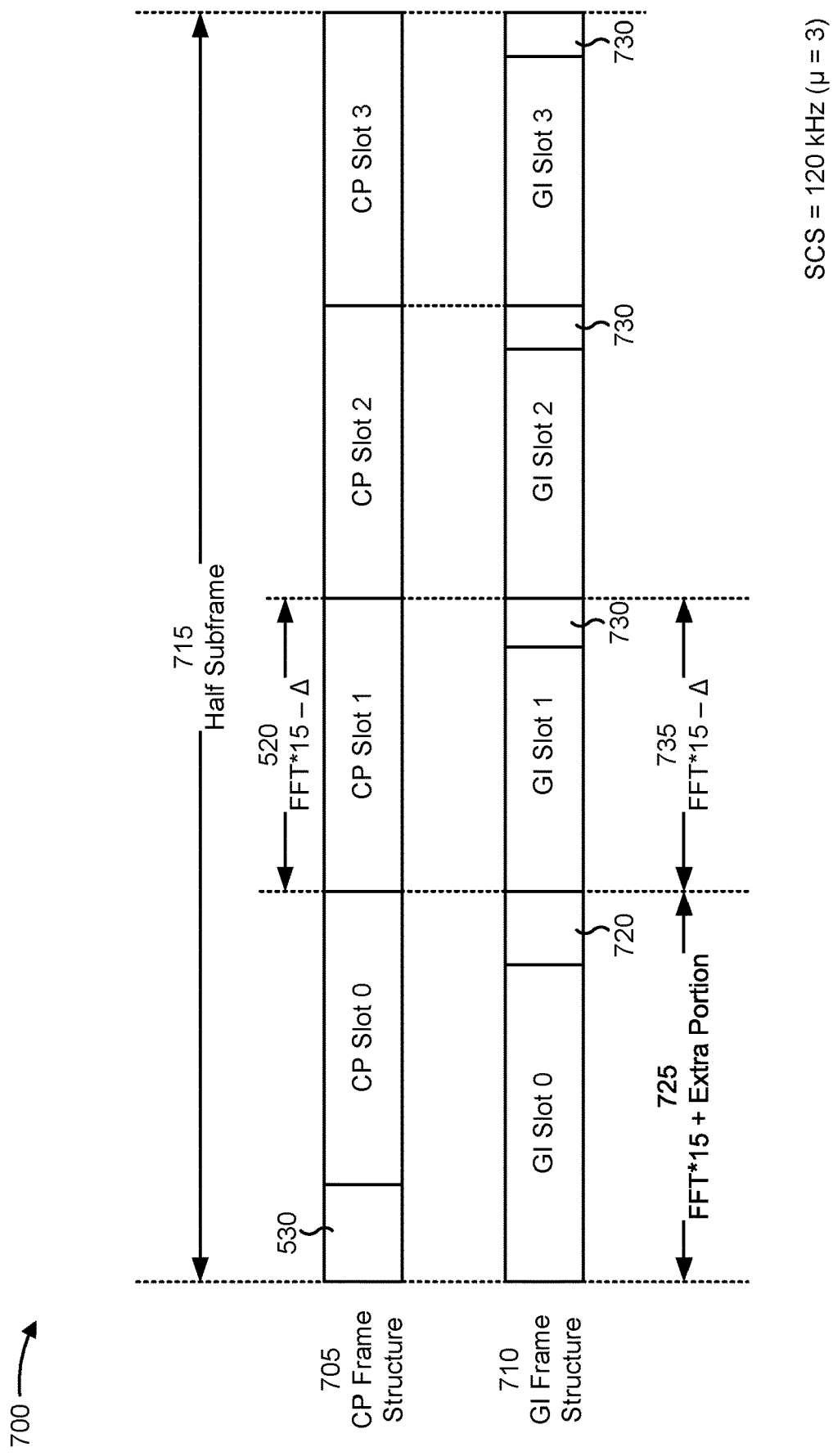

FIG. 7 is a diagram illustrating an example 700 associated with slot alignment between CP-based waveforms and GI-based waveforms, in accordance with the present disclosure.

FIG. 7 shows a first example of a CP frame structure 705 associated with a CP-based waveform and a GI frame structure 710 associated with a GI-based waveform. The CP frame structure 705 may include multiple CP slots (e.g., CP slot 0, CP slot 1, CP slot 2, CP slot 3) arranged in a half subframe 715. Similarly, the GI frame structure 710 may include multiple GI slots (e.g., GI slot 0, GI slot 1, GI slot 2, GI slot 3) arranged in the half subframe 715. For ease of description, the half subframe 715 shown in FIG. 7 is associated with a 120 kHz SCS (e.g., $\mu=3$), and thus each frame structure includes eight corresponding slots per subframe and thus four corresponding slots in the half subframe 715 shown in FIG. 7. Aspects of the disclosure are not so limited, however, and, in some other aspects, different SCSs (and thus different number of slots per subframe) may be employed without departing from the scope of the disclosure.

In this example, each GI slot is associated with one of an extra portion, a truncated portion, or a removed portion such that a boundary of each GI slot aligns with a boundary of a corresponding CP slot. In that regard, the first GI slot 620 described in connection with FIG. 6 may correspond to any one of GI slot 0, GI slot 1, GI slot 2, or GI slot 3, and the first CP slot 625 described in connection with FIG. 6 may correspond to any one of CP slot 0, CP slot 1, CP slot 2, or CP slot 3, respectively.

Moreover, in such aspects, a first-in-time GI slot (e.g., GI slot 0) is associated with an extra portion 720. As described in connection with FIG. 5, a length of a typical GI slot is FFT*15 samples long. Thus, as shown by reference number 725, GI slot 0 has a length of FFT*15+a length of the extra portion 720 samples long. In this way, an end boundary of GI slot 0 aligns with an end boundary of CP slot 0. In some aspects, when the CP frame structure 705 and the GI frame structure 710 are associated with a FFT size of 4096 samples, a length of the extra portion 720 is $32*2^{\mu}-64$ samples long. Thus, a length of the GI slot 0 (as shown by reference number 725) may be $FFT*15+32*2^{\mu}-64$ samples long, or $4096*15+32*2^{\mu}-64$ samples long for an FFT size of 4096 samples.

Moreover, in this example, the remaining depicted GI slots (e.g., a second-in-time or later slot, including GI slot 1, GI slot 2, and GI slot 3) are associated with one of a truncated portion or a removed portion 730 such that a boundary of each remaining GI slot aligns with a boundary of a corresponding CP slot. As described in connection with FIG. 5, a length of a CP slot is $FFT*15-\Delta$ samples long. Moreover, as shown in FIG. 7, due to the inclusion of the one of a truncated portion or the removed portion 730, the length of GI slot 1, GI slot 2, and GI slot 3 are the same as a CP slot. Thus, as shown by reference number 735, a length of the GI slots associated with the one of the truncated portion or the removed portion 730 is $FFT*15-\Delta$ samples long. In some aspects, the one of the truncated portion or the removed portion 730 may be a truncated last-in-time symbol of the GI slot or a removed last-in-time symbol of the GI slot. In such aspects, the length of the one of the truncated portion or the removed portion 730 is $FFT-\Delta$, which, when the CP frame structure 705 and the GI frame structure 710 are associated with a FFT size of 4096 samples, is equal to 4096−64 samples long (e.g., the length of the one of the truncated portion or the removed portion 730 is 4032 samples long).

In some aspects, the one of the truncated portion or the removed portion 730 may be associated with a removed last-in-time symbol (e.g., a removed fifteenth symbol) of a corresponding GI slot. That is, to configure the one of the truncated portion or the removed portion 730, the network entity 605 may leave a gap in the transmission timeline between a fourteenth symbol of one slot (e.g., the GI slot 1) and a first symbol of the subsequent GI slot (e.g., the GI slot 2). Similarly, the extra portion 720 may be associated with a gap between the last symbol of the first-in-time slot (e.g., a fifteenth symbol of GI slot 0) and a first symbol of a subsequent slot (e.g., GI slot 1). In such aspects, the gap left between subsequent slots may be useful for noise estimation, beam switching, or the like.

In some other aspects, the extra portion 720 and/or the one of truncated portion or the removed portion 730 may be associated with samples in a time domain that are not associated with an OFDM symbol (e.g., may be associated with a single-carrier waveform that is not associated with OFDM and thus can be transmitted in a length of time corresponding to a partial symbol). In some other aspects, the extra portion 720 and/or the one of truncated portion or the removed portion 730 may be associated with an OFDM symbol. For example, an OFDM symbol may be generated that includes only zero information bits in a portion that overlaps with a subsequent symbol (e.g., a first symbol of a subsequent slot) such that the portion including only zero information bits (sometimes referred to as a zero tail) does not create inter-symbol interference with the subsequent symbol (e.g., the first symbol of a subsequent slot). In some aspects, the extra portion 720 and/or the one of truncated portion or the removed portion 730 may be used for transmitting reference signals (e.g., a phase tracking reference signal (PTRS), a sounding reference signal (SRS), a channel state information (CSI) reference signal (CSI-RS), a DMRS, or a similar reference signal) for purposes of phase tracking, channel estimation, or the like.

Because each GI slot is aligned with a corresponding CP slot, the UE 120 and network entity 605 may easily switch between CP-based waveform communications and GI-based waveform communications. For example, the UE may transmit or receive a first message in one of the GI slots in the half subframe 715, and the UE may transmit or receive a second message in one of the CP slots in the half subframe 715. Because each GI slot boundary is aligned with a corresponding CP slot boundary, the UE 120 and network entity 605 may, in this aspect, switch at any slot boundary. In some other aspects, however, slot boundaries may instead only be aligned at the point of switchover, which will be described in more detail in connection with FIGS. 8 and 9, below.

As indicated above, FIG. 7 is provided as an example. Other examples may differ from what is described with respect to FIG. 7.

Figure 8:
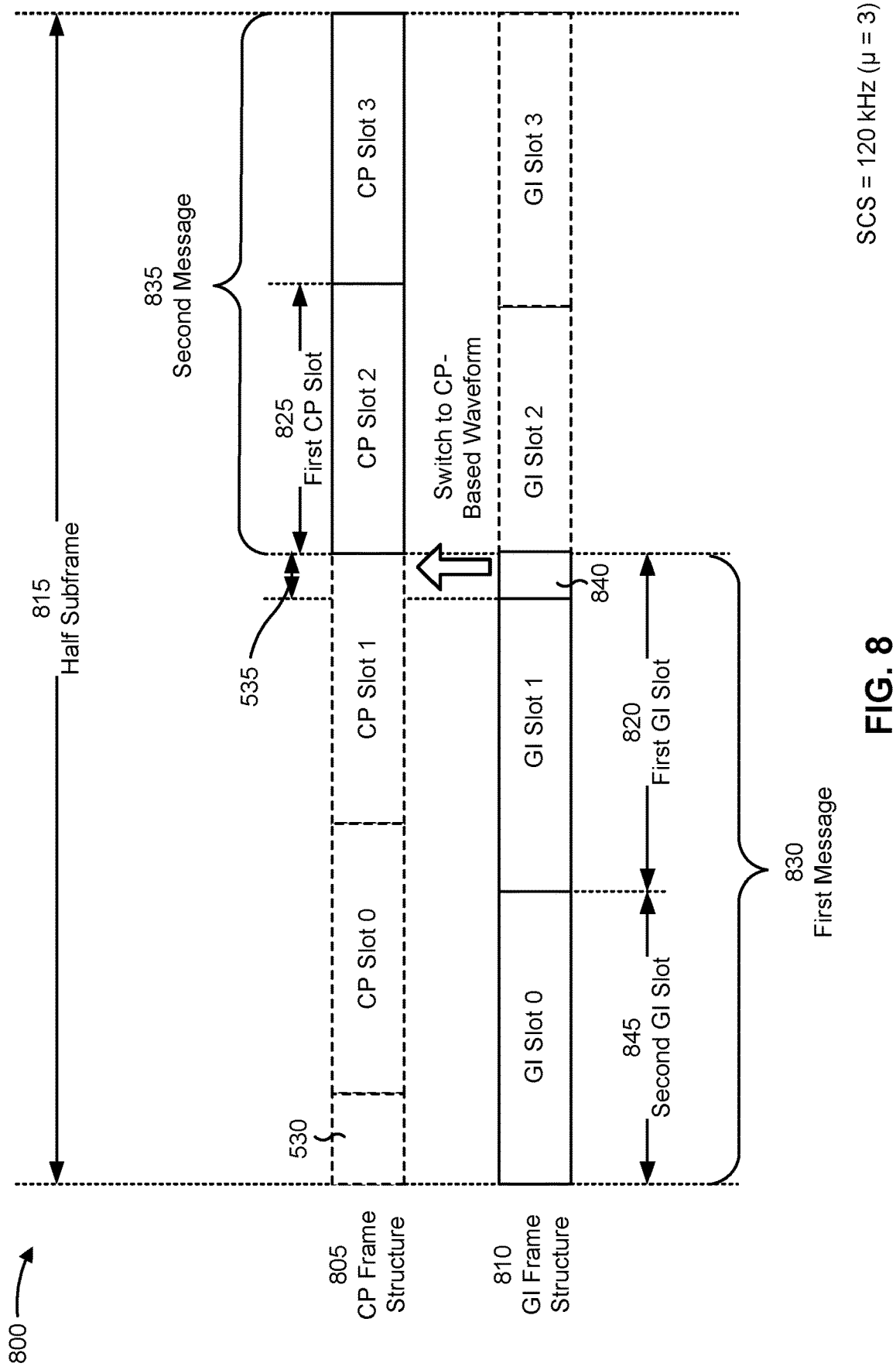
Figure 9:
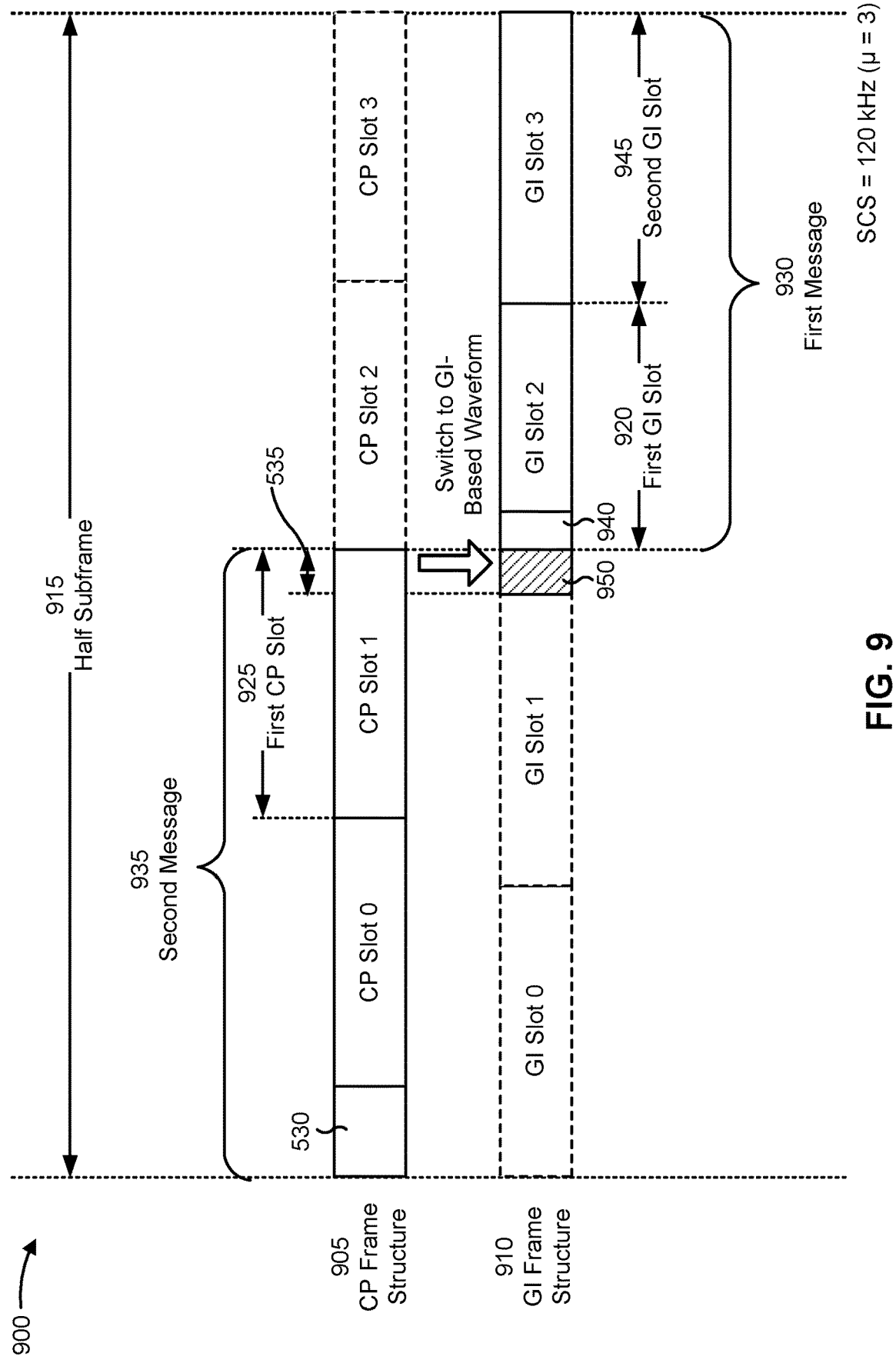

FIGS. 8 and 9 are diagrams illustrating examples 800, 900 associated with slot alignment between CP-based waveforms and GI-based waveforms, in accordance with the present disclosure.

First, FIG. 8 shows a CP frame structure 805 associated with a CP-based waveform and a GI frame structure 810 associated with a GI-based waveform. Similar to the CP frame structure 705 described in connection with FIG. 7, the CP frame structure 805 may include multiple CP slots (e.g., CP slot 0, CP slot 1, CP slot 2, CP slot 3, and so forth) arranged in a half subframe 815. Similarly, the GI frame structure 810 may include multiple GI slots (e.g., GI slot 0, GI slot 1, GI slot 2, GI slot 3, and so forth) arranged in the half subframe 815. For ease of description, the half subframe 815 shown in FIG. 8 is associated with a 120 kHz SCS (e.g., $\mu$=3), and thus each frame structure includes eight corresponding slots per subframe and thus four corresponding slots in the half subframe 815 shown in FIG. 8. Aspects of the disclosure are not so limited, however, and, in some other aspects, different SCSs (and thus different number of slots per subframe) may be employed without departing from the scope of the disclosure.

In the example 800 shown in FIG. 8, the UE 120 and/or the network entity 605 may switch from a GI-based waveform communication to a CP-based waveform communication. More particularly, the UE 120 and/or the network entity 605 may switch from the GI-based waveform after the second slot of the subframe (e.g., GI slot 1) and begin transmitting or receiving using the CP-based waveform beginning in the third slot of the subframe (e.g., CP slot 2). In such aspects, the first GI slot 620 described in connection with FIG. 6 may correspond to GI slot 1, indicated as a first GI slot 820 in example 800, and the first CP slot 625 described in connection with FIG. 6 may correspond to CP slot 2, indicated as a first CP slot 825 in example 800. Moreover, in this example, a first message 830 (e.g., a message transmitted or received using the GI-based waveform) is transmitted or received prior-in-time to a second message 835 (e.g., the first message 830 is transmitted or received in the first GI slot 820 (e.g., GI slot 1), and the second message 835 is transmitted or received in the first CP slot 825 (e.g., CP slot 2)). In this aspect, the first GI slot 820 is associated with an extra portion 840 such that the second message 835 begins at the boundary of the first CP slot 825 (e.g., CP slot 2). Put another way, the first GI slot 820 (e.g., GI slot 1) is associated with the extra portion 840 in order to compensate for the second offset distance 535 between boundaries of GI slot 1 and CP slot 2, described in connection with FIG. 5.

In some aspects, the first message 830 may further be transmitted or received in a second GI slot 845 (e.g., in the depicted example, GI slot 0) occurring prior-in-time to the first GI slot 820 (e.g., GI slot 1). Moreover, as shown in FIG. 8, the second GI slot 845 (e.g., GI slot 0) may not be associated with an extra portion, a truncated portion, or a removed portion. This is because, in this example, an extra portion, a truncated portion, or a removed portion is only included when switching between the GI-based waveform and the CP-based waveform, and otherwise the GI frame structure 810 follows a similar pattern to the GI frame structure 510 described in connection with FIG. 5.

In some aspects, when the CP frame structure 805 and the GI frame structure 810 are associated with an FFT size of 4096 samples, a length of the extra portion 840 is $32*2^\mu - 64(k+1)$ samples, with $\mu$ being associated with a numerology used for transmission and k corresponding to a slot index of the first GI slot 820, beginning from k=0 for the first slot in the half subframe 815 (e.g., k is the slot index of the slot located at the point of switchover, which, in the depicted example, k=1 because GI slot 1 corresponds to the first GI slot 820). Thus, for the 120 kHz SCS (e.g., $\mu$=3) example depicted in FIG. 8, the extra portion 840 may have a length of $32*2^3-64(1+1)$ samples long, or 128 samples long (which is equal to the second offset distance 535 described in connection with FIG. 5). As described in connection with FIG. 7, the extra portion 840 may be associated with a gap between two symbols (e.g., a gap following the fifteenth symbol of GI slot 1 and preceding the first symbol of CP slot 2), may be associated with samples in a time domain that are not associated with an OFDM symbol (e.g., may be associated with a single-carrier waveform), or may be associated with a zero-tail OFDM symbol. Moreover, in some aspects, the extra portion 840 may be used for purposes of noise measurement and/or beam switching or may be used for transmitting reference signals (e.g., a PTRS, an SRS, a CSI-RS, a DMRS, or a similar reference signal) for purposes of phase tracking, channel estimation, or the like.

FIG. 9 similarly shows a CP frame structure 905 associated with a CP-based waveform and a GI frame structure 910 associated with a GI-based waveform. Similar to the CP frame structure 805 described in connection with FIG. 8, the CP frame structure 905 may include multiple CP slots (e.g., CP slot 0, CP slot 1, CP slot 2, CP slot 3, and so forth) arranged in a half subframe 915. Similarly, the GI frame structure 910 may include multiple GI slots (e.g., GI slot 0, GI slot 1, GI slot 2, GI slot 3, and so forth) arranged in the half subframe 915. As in FIG. 8, the half subframe 915 shown in FIG. 9 is associated with a 120 kHz SCS (e.g., $\mu$=3), and thus each frame structure includes eight corresponding slots per subframe and thus four corresponding slots in the half subframe 915 shown in FIG. 9. Aspects of the disclosure are not so limited, however, and, in some other aspects, different SCSs (and thus different number of slots per subframe) may be employed without departing from the scope of the disclosure.

In the example 900 shown in FIG. 9, the UE 120 and/or the network entity 605 may switch from a CP-based waveform communication to a GI-based waveform communication. More particularly, the UE 120 and/or the network entity 605 may switch from the CP-based waveform after the second slot of the subframe (e.g., CP slot 1) and begin transmitting or receiving using the GI-based waveform beginning in the third slot of the subframe (e.g., GI slot 2). In such aspects, the first GI slot 620 described in connection with FIG. 6 may correspond to GI slot 2, indicated as a first GI slot 920 in example 900, and the first CP slot 625 described in connection with FIG. 6 may correspond to CP slot 1, indicated as a first CP slot 925 in example 900. Moreover, in this example, a first message transmitted or received using the GI-based waveform is transmitted or received later-in-time to a second message 935 transmitted or received using the CP-based waveform (e.g., the first message 930 is transmitted or received in the first GI slot 920 (e.g., GI slot 2), and the second message 935 is transmitted or received in the first CP slot 925 (e.g., CP slot 1)). Accordingly, the first GI slot 920 is associated with one of a truncated portion or a removed portion 940 such that the first message 930 begins at the boundary of the first GI slot 920 (e.g., GI slot 2). Put another way, the first GI slot 920 (e.g., GI slot 2) is associated with the one of the truncated portion or the removed portion 940 in order to compensate for the second offset distance 535 described in connection with FIG. 5.

In some aspects, the first message 930 may further be transmitted or received in a second GI slot 945 (e.g., in the depicted example, GI slot 3) occurring later-in-time to the first GI slot 920 (e.g., GI slot 2). Moreover, as shown in FIG. 9, the second GI slot 945 (e.g., GI slot 3) may not be associated with an extra portion, a truncated portion, or a removed portion. This is because, in this example, an extra portion, a truncated portion, or a removed portion is only included when switching between the GI-based waveform and the CP-based waveform, and otherwise the GI frame structure 910 follows a similar pattern to the GI frame structure 510 described in connection with FIG. 5.

In some aspects, the truncated portion or the removed portion 940 is configured by shortening a length of the first GI slot 920 by a length of a cut-out portion 950. Moreover, when the CP frame structure 905 and the GI frame structure 910 are associated with a FFT size of 4096 samples, a length of the cut-out portion is $32*2^\mu-64(k+1)$ samples, with $\mu$ being associated with a numerology used for transmission and k corresponding to a slot index of a slot immediately preceding the first GI slot 920, beginning from k=0 for the first slot in the half subframe 915 (e.g., in the depicted example, k=1 because GI slot 1 corresponds to the slot immediately preceding the first GI slot 920). Thus, for the 120 kHz SCS (e.g., $\mu$=3) example depicted in FIG. 9, the cut-out portion 950 may have a length of $32*2^3-64(1+1)$ samples long, or 128 samples long (which is equal to the second offset distance 535 described in connection with FIG. 5). As described in connection with FIG. 7, the truncated portion or the removed portion 940 may be associated with a gap between two symbols (e.g., a gap following the fourteenth symbol of CP slot 1 and preceding the first symbol of GI slot 2), may be associated with samples in a time domain that are not associated with an OFDM symbol (e.g., may be associated with a single carrier waveform), or may be associated with a zero-tail OFDM symbol. Moreover, in some aspects, the truncated portion or the removed portion 940 may be used for purposes of noise measurement and/or beam switching or may be used for transmitting reference signals (e.g., a PTRS, an SRS, a CSI-RS, a DMRS, or a similar reference signal) for purposes of phase tracking, channel estimation, or the like.

As indicated above, FIGS. 8 and 9 are provided as examples. Other examples may differ from what is described with respect to FIGS. 8 and 9.

Figure 10:
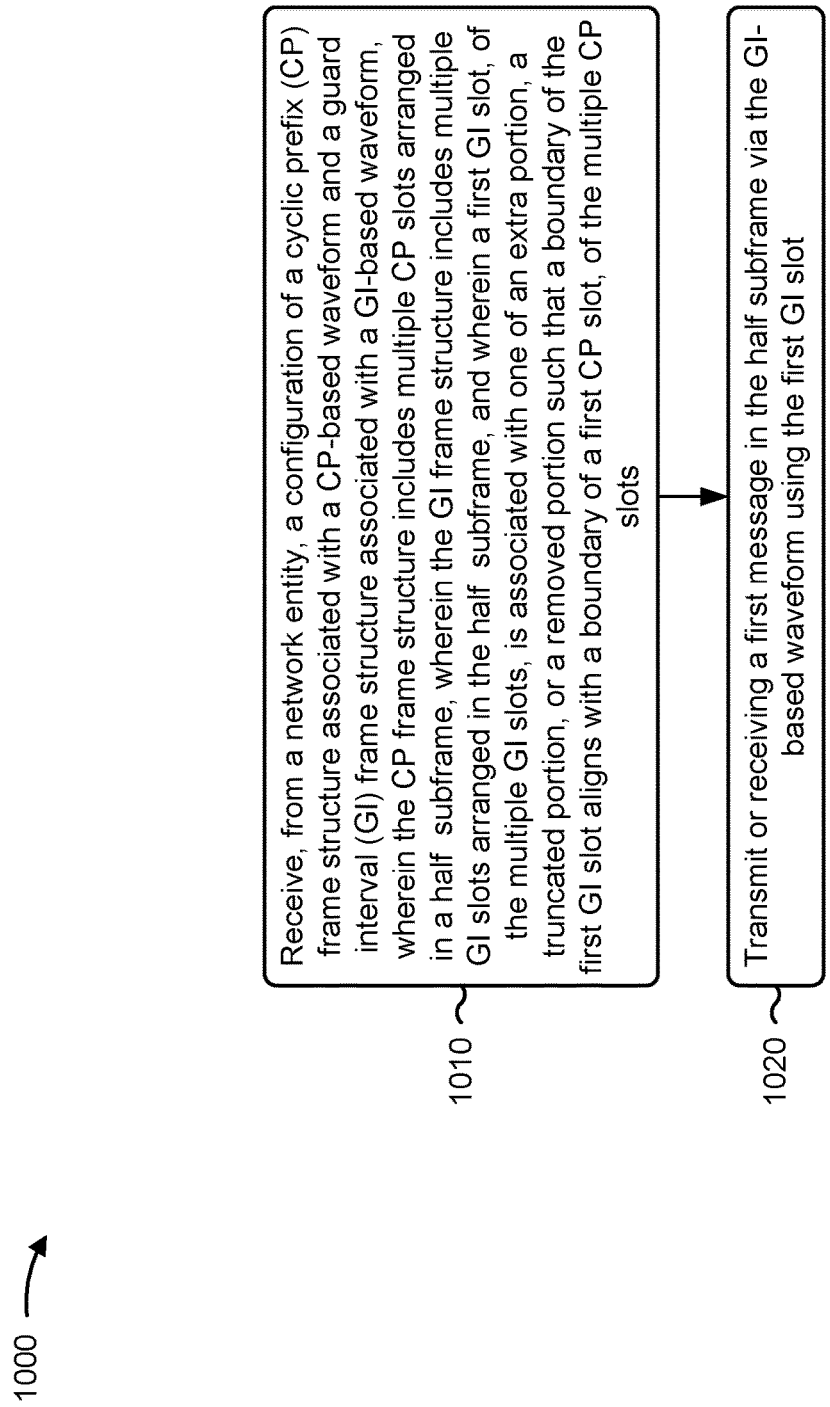
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with slot alignment between CP-based waveforms and GI-based waveforms.

As shown in FIG. 10, in some aspects, process 1000 may include receiving, from a network entity (e.g., the network entity 605), a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots (block 1010). For example, the UE (e.g., using communication manager 1208 and/or reception component 1202, depicted in FIG. 12) may receive, from a network entity, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots, as described above.

As further shown in FIG. 10, in some aspects, process 1000 may include transmitting or receiving a first message in the half subframe via the GI-based waveform using the first GI slot (block 1020). For example, the UE (e.g., using communication manager 1208, transmission component 1204, and/or reception component 1202, depicted in FIG. 12) may transmit or receive a first message in the half subframe via the GI-based waveform using the first GI slot, as described above.

Process 1000 may include additional aspects, such as any single aspect or any combination of aspects described below and/or in connection with one or more other processes described elsewhere herein.

In a first aspect, the first GI slot is associated with the extra portion, and a second GI slot, of the multiple GI slots, is associated with one of a truncated portion or a removed portion such that a boundary of the second GI slot aligns with a boundary of a second CP slot, of the multiple CP slots.

In a second aspect, alone or in combination with the first aspect, the CP frame structure and the GI frame structure are associated with an FFT size of 4096 samples, a length of the extra portion is $32*2\mu-64$ samples with $\mu$ being associated with a numerology used for transmission, and a length of the one of the truncated portion or the removed portion is 4032 samples.

In a third aspect, alone or in combination with one or more of the first and second aspects, the first GI slot is a first-in-time slot of the half subframe, and the second GI slot is a second-in-time or later slot of the half subframe.

In a fourth aspect, alone or in combination with one or more of the first through third aspects, the first GI slot is associated with the removed portion, and the removed portion is associated with a removed last-in-time symbol of the first GI slot.

In a fifth aspect, alone or in combination with one or more of the first through fourth aspects, the one of the extra portion, the truncated portion, or the removed portion is associated with a gap between the first GI slot and a second GI slot, of the multiple GI slots.

In a sixth aspect, alone or in combination with one or more of the first through fifth aspects, the one of the extra portion, the truncated portion, or the removed portion is associated with samples in a time domain that are not associated with an OFDM symbol.

In a seventh aspect, alone or in combination with one or more of the first through sixth aspects, the one of the extra portion, the truncated portion, or the removed portion is associated with a zero-tailed OFDM symbol.

In an eighth aspect, alone or in combination with one or more of the first through seventh aspects, process 1000 includes transmitting or receiving a second message, later-in-time to the first message, in the half subframe via the CP-based waveform using the first CP slot, wherein the first GI slot is associated with the extra portion such that the second message begins at the boundary of the first CP slot.

In a ninth aspect, alone or in combination with one or more of the first through eighth aspects, the first message is further transmitted or received in a second GI slot, of the multiple GI slots, occurring prior-in-time to the first GI slot, and the second GI slot is not associated with an extra portion, a truncated portion, or a removed portion.

In a tenth aspect, alone or in combination with one or more of the first through ninth aspects, the CP frame structure and the GI frame structure are associated with an FFT size of 4096 samples, and a length of the extra portion is $32*2\mu-64(k+1)$ samples with $\mu$ being associated with a numerology used for transmission and k corresponding to a slot index of the first GI slot.

In an eleventh aspect, alone or in combination with one or more of the first through tenth aspects, process 1000 includes transmitting or receiving a second message, prior-in-time to the first message, in the half subframe via the CP-based waveform using the first CP slot, wherein the first GI slot is associated with one of the truncated portion or the removed portion such that the first message begins at the boundary of the first GI slot.

In a twelfth aspect, alone or in combination with one or more of the first through eleventh aspects, the first message is further transmitted or received in a second GI slot, of the multiple GI slots, occurring later-in-time to the first GI slot, and the second GI slot is not associated with an extra portion, a truncated portion, or a removed portion.

In a thirteenth aspect, alone or in combination with one or more of the first through twelfth aspects, the CP frame structure and the GI frame structure are associated with an FFT size of 4096 samples, and a length of the one of the truncated portion or the removed portion is $32*2\mu-64(k+1)$ samples with $\mu$ being associated with a numerology used for transmission and k corresponding to a slot index of a slot immediately preceding the first GI slot.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
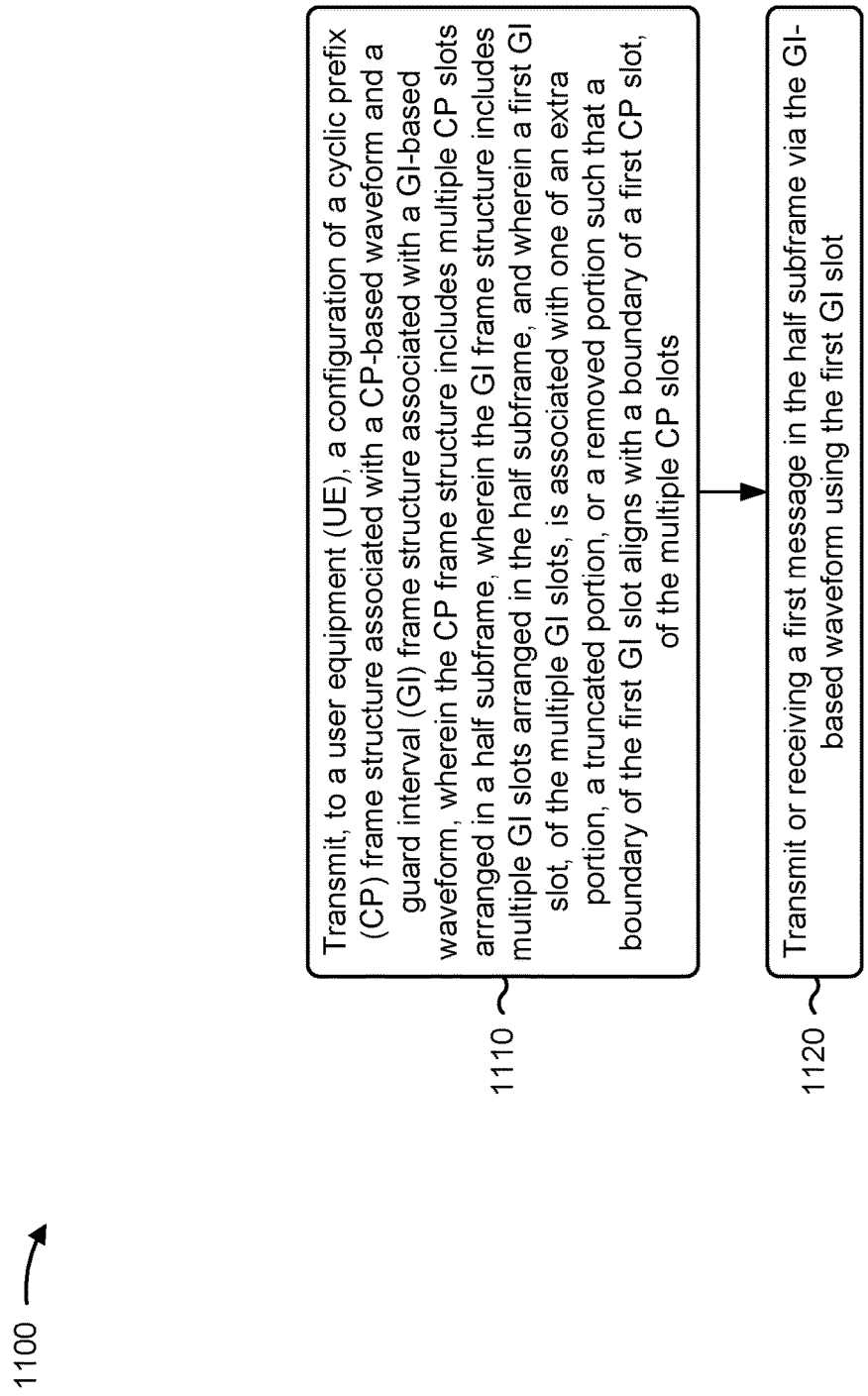
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., network entity 605) performs operations associated with slot alignment between CP-based waveforms and GI-based waveforms.

As shown in FIG. 11, in some aspects, process 1100 may include transmitting, to a UE (e.g., UE 120), a configuration of CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots (block 1110). For example, the network entity (e.g., using communication manager 1308 and/or transmission component 1304, depicted in FIG. 13) may transmit, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots, as described above.

As further shown in FIG. 11, in some aspects, process 1100 may include transmitting or receiving a first message in the half subframe via the GI-based waveform using the first GI slot (block 1120). For example, the network entity (e.g., using communication manager 1308, transmission component 1304, and/or reception component 1302, depicted in FIG. 13) may transmit or receive a first message in the half subframe via the GI-based waveform using the first GI slot, as described above.

Process 1100 may include additional aspects, such as any single aspect or any combination of aspects described below and/or in connection with one or more other processes described elsewhere herein.

In a first aspect, the first GI slot is associated with the extra portion, and a second GI slot, of the multiple GI slots, is associated with one of a truncated portion or a removed portion such that a boundary of the second GI slot aligns with a boundary of a second CP slot, of the multiple CP slots.

In a second aspect, alone or in combination with the first aspect, the CP frame structure and the GI frame structure are associated with an FFT size of 4096 samples, a length of the extra portion is $32*2\mu-64$ samples with $\mu$ being associated with a numerology used for transmission, and a length of the one of the truncated portion or the removed portion is 4032 samples.

In a third aspect, alone or in combination with one or more of the first and second aspects, the first GI slot is a first-in-time slot of the half subframe, and the second GI slot is a second-in-time or later slot of the half subframe.

In a fourth aspect, alone or in combination with one or more of the first through third aspects, the first GI slot is associated with the removed portion, and the removed portion is associated with a removed last-in-time symbol of the first GI slot.

In a fifth aspect, alone or in combination with one or more of the first through fourth aspects, the one of the extra portion, the truncated portion, or the removed portion is associated with a gap between the first GI slot and a second GI slot, of the multiple GI slots.

In a sixth aspect, alone or in combination with one or more of the first through fifth aspects, the one of the extra portion, the truncated portion, or the removed portion is associated with samples in a time domain that are not associated with an OFDM symbol.

In a seventh aspect, alone or in combination with one or more of the first through sixth aspects, the one of the extra portion, the truncated portion, or the removed portion is associated with a zero-tailed OFDM symbol.

In an eighth aspect, alone or in combination with one or more of the first through seventh aspects, process 1100 includes transmitting or receiving a second message, later-in-time to the first message, in the half subframe via the CP-based waveform using the first CP slot, wherein the first GI slot is associated with the extra portion such that the second message begins at the boundary of the first CP slot.

In a ninth aspect, alone or in combination with one or more of the first through eighth aspects, the first message is further transmitted or received in a second GI slot, of the multiple GI slots, occurring prior-in-time to the first GI slot, and the second GI slot is not associated with an extra portion, a truncated portion, or a removed portion.

In a tenth aspect, alone or in combination with one or more of the first through ninth aspects, the CP frame structure and the GI frame structure are associated with an FFT size of 4096 samples, and a length of the extra portion is $32*2\mu-64(k+1)$ samples with $\mu$ being associated with a numerology used for transmission and k corresponding to a slot index of the first GI slot.

In an eleventh aspect, alone or in combination with one or more of the first through tenth aspects, process 1100 includes transmitting or receiving a second message, prior-in-time to the first message, in the half subframe via the CP-based waveform using the first CP slot, wherein the first GI slot is associated with one of the truncated portion or the removed portion such that the first message begins at the boundary of the first GI slot.

In a twelfth aspect, alone or in combination with one or more of the first through eleventh aspects, the first message is further transmitted or received in a second GI slot, of the multiple GI slots, occurring later-in-time to the first GI slot, and the second GI slot is not associated with an extra portion, a truncated portion, or a removed portion.

In a thirteenth aspect, alone or in combination with one or more of the first through twelfth aspects, the CP frame structure and the GI frame structure are associated with an FFT size of 4096 samples, and a length of the one of the truncated portion or the removed portion is $32*2\mu-64(k+1)$ samples with $\mu$ being associated with a numerology used for transmission and k corresponding to a slot index of a slot immediately preceding the first GI slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
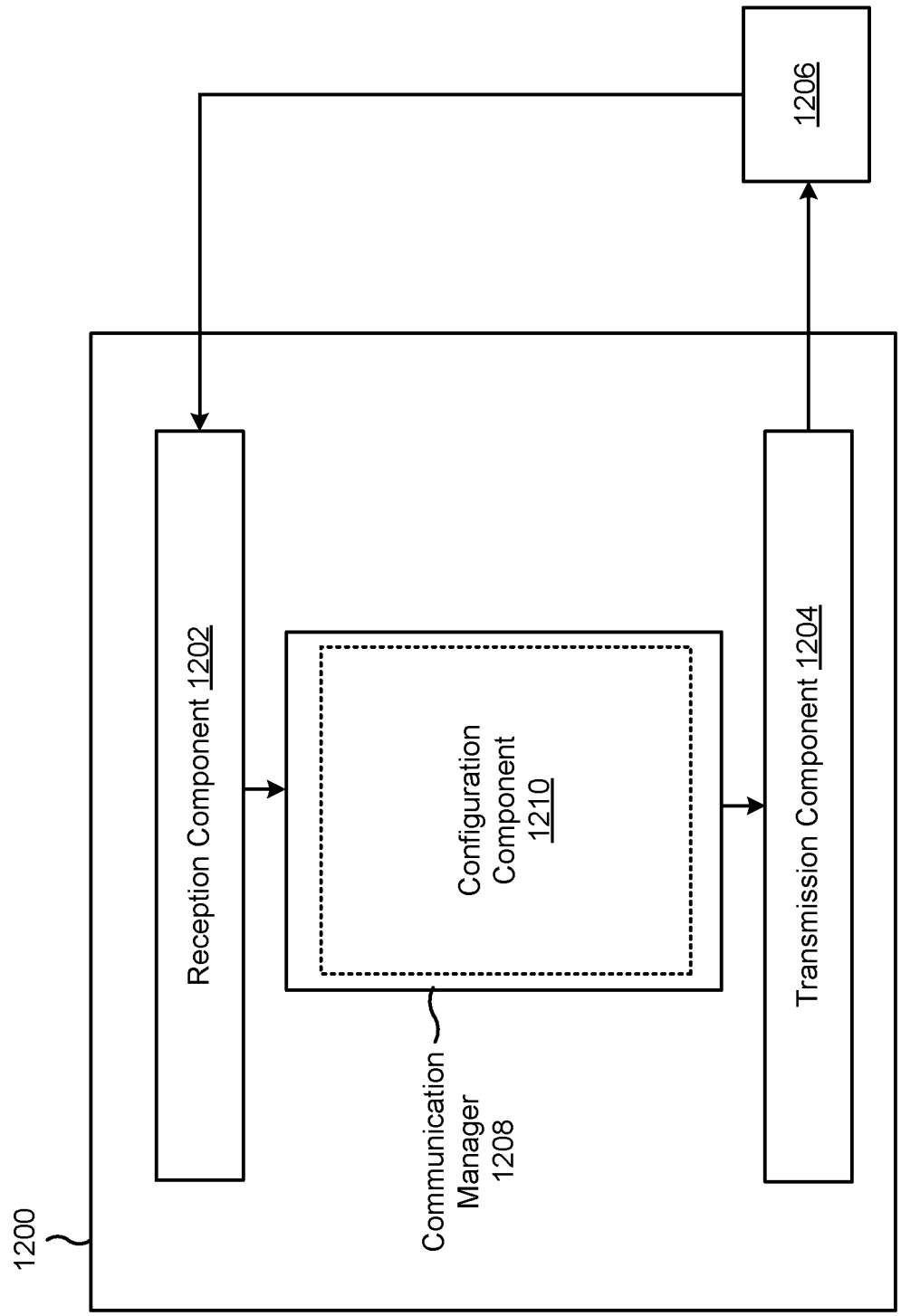
FIGS. 12 and 13 are diagrams of an example apparatuses for wireless communication, in accordance with the present disclosure.

FIG. 12 is a diagram of an example apparatus 1200 for wireless communication, in accordance with the present disclosure. The apparatus 1200 may be a UE (e.g., UE 120), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208 (e.g., communication manager 140). The communication manager 1208 may include a configuration component 1210, among other examples.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 and/or the configuration component 1210 may receive, from a network entity (e.g., network entity 605), a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The transmission component 1204 and/or the reception component 1202 may transmit or receive a first message in the half subframe via the GI-based waveform using the first GI slot.

The transmission component 1204 and/or the reception component 1202 may transmit or receive a second message, later-in-time to the first message, in the half subframe via the CP-based waveform using the first CP slot, wherein the first GI slot is associated with the extra portion such that the second message begins at the boundary of the first CP slot.

The transmission component 1204 and/or the reception component 1202 may transmit or receive a second message, prior-in-time to the first message, in the half subframe via the CP-based waveform using the first CP slot, wherein the first GI slot is associated with one of the truncated portion or the removed portion such that the first message begins at the boundary of the first GI slot.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
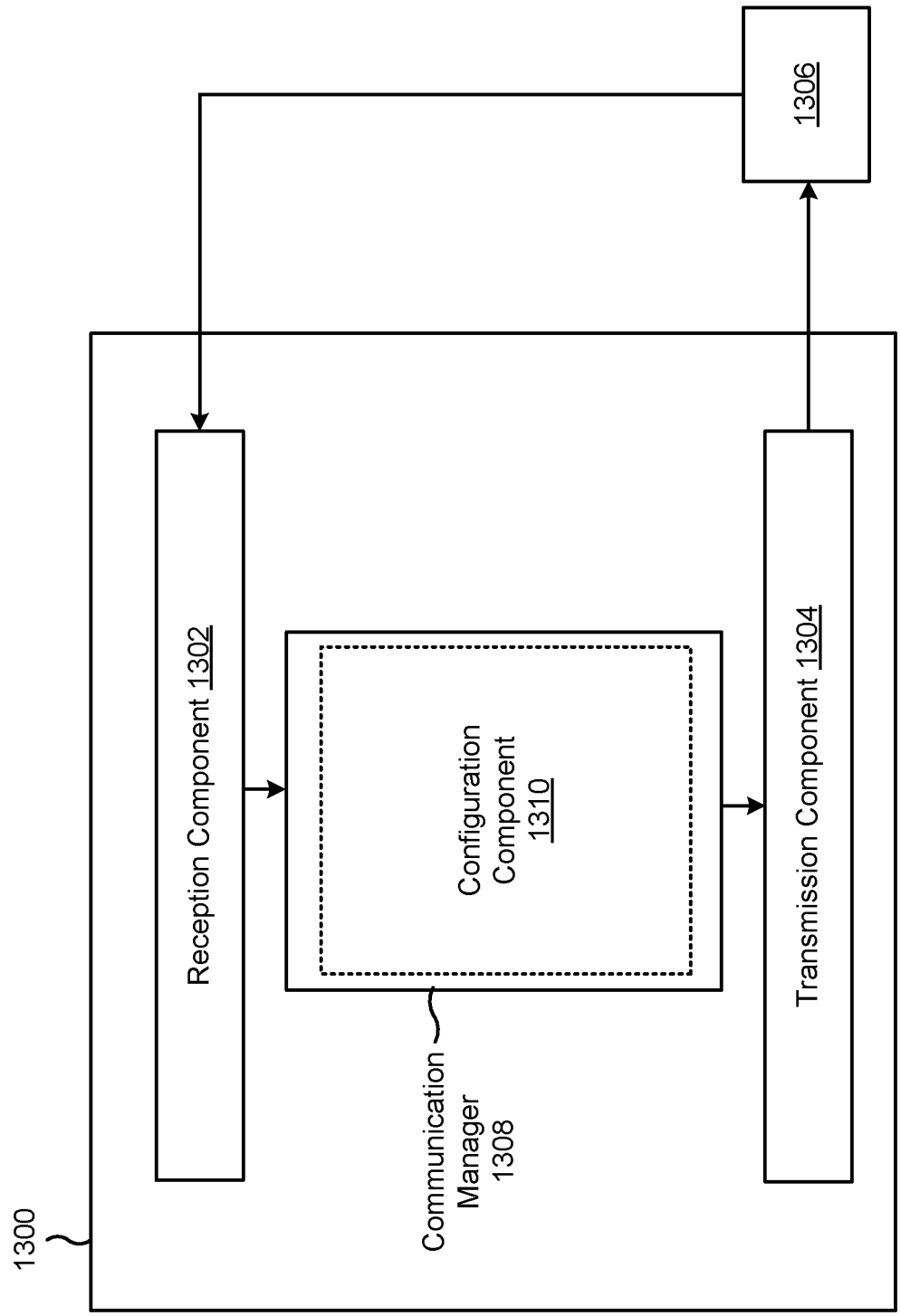

FIG. 13 is a diagram of an example apparatus 1300 for wireless communication. The apparatus 1300 may be a network entity (e.g., network entity 605), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308 (e.g., communication manager 150). The communication manager 1308 may include a configuration component 1310, among other examples.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station 110 described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The transmission component 1304 and/or the configuration component 1310 may transmit, to a UE (e.g., UE 120), a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots. The transmission component 1304 may transmit or receiving a first message in the half subframe via the GI-based waveform using the first GI slot.

The transmission component 1304 and/or the reception component 1302 may transmit or receive a second message, later-in-time to the first message, in the half subframe via the CP-based waveform using the first CP slot, wherein the first GI slot is associated with the extra portion such that the second message begins at the boundary of the first CP slot.

The transmission component 1304 and/or the reception component 1302 may transmit or receive a second message, prior-in-time to the first message, in the half subframe via the CP-based waveform using the first CP slot, wherein the first GI slot is associated with one of the truncated portion or the removed portion such that the first message begins at the boundary of the first GI slot.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving, from a network entity, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and transmitting or receiving a first message in the half subframe via the GI-based waveform using the first GI slot.

Aspect 2: The method of Aspect 1, wherein the first GI slot is associated with the extra portion, and wherein a second GI slot, of the multiple GI slots, is associated with one of a truncated portion or a removed portion such that a boundary of the second GI slot aligns with a boundary of a second CP slot, of the multiple CP slots.

Aspect 3: The method of any of Aspects 2, wherein the CP frame structure and the GI frame structure are associated with an FFT size of 4096 samples, wherein a length of the extra portion is $32*2\mu-64$ samples with $\mu$ being associated with a numerology used for transmission, and wherein a length of the one of the truncated portion or the removed portion is 4032 samples.

Aspect 4: The method of any of Aspects 2-3, wherein the first GI slot is a first-in-time slot of the half subframe, and wherein the second GI slot is a second-in-time or later slot of the half subframe.

Aspect 5: The method of any of Aspects 1-4, wherein the first GI slot is associated with the removed portion, and wherein the removed portion is associated with a removed last-in-time symbol of the first GI slot.

Aspect 6: The method of any of Aspects 1-5, wherein the one of the extra portion, the truncated portion, or the removed portion is associated with a gap between the first GI slot and a second GI slot, of the multiple GI slots.

Aspect 7: The method of any of Aspects 1-5, wherein the one of the extra portion, the truncated portion, or the removed portion is associated with samples in a time domain that are not associated with an OFDM symbol.

Aspect 8: The method of any of Aspects 1-5, wherein the one of the extra portion, the truncated portion, or the removed portion is associated with a zero-tailed OFDM symbol.

Aspect 9: The method of any of Aspects 1-8, further comprising transmitting or receiving a second message, later-in-time to the first message, in the half subframe via the CP-based waveform using the first CP slot, wherein the first GI slot is associated with the extra portion such that the second message begins at the boundary of the first CP slot.

Aspect 10: The method of Aspect 9, wherein the first message is further transmitted or received in a second GI slot, of the multiple GI slots, occurring prior-in-time to the first GI slot, and wherein the second GI slot is not associated with an extra portion, a truncated portion, or a removed portion.

Aspect 11: The method of Aspect 9, wherein the CP frame structure and the GI frame structure are associated with an FFT size of 4096 samples, and wherein a length of the extra portion is $32*2\mu-64(k+1)$ samples with $\mu$ being associated with a numerology used for transmission and k corresponding to a slot index of the first GI slot.

Aspect 12: The method of any of Aspects 1-8, further comprising transmitting or receiving a second message, prior-in-time to the first message, in the half subframe via the CP-based waveform using the first CP slot, wherein the first GI slot is associated with one of the truncated portion or the removed portion such that the first message begins at the boundary of the first GI slot.

Aspect 13: The method of Aspect 12, wherein the first message is further transmitted or received in a second GI slot, of the multiple GI slots, occurring later-in-time to the first GI slot, and wherein the second GI slot is not associated with an extra portion, a truncated portion, or a removed portion.

Aspect 14: The method of Aspect 12, wherein the CP frame structure and the GI frame structure are associated with an FFT size of 4096 samples, and wherein a length of the one of the truncated portion or the removed portion is $32*2\mu-64(k+1)$ samples with $\mu$ being associated with a numerology used for transmission and k corresponding to a slot index of a slot immediately preceding the first GI slot.

Aspect 15: A method of wireless communication performed by a network entity, comprising: transmitting, to a UE, a configuration of a CP frame structure associated with a CP-based waveform and a GI frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and transmitting or receiving a first message in the half subframe via the GI-based waveform using the first GI slot.

Aspect 16: The method of Aspect 15, wherein the first GI slot is associated with the extra portion, and wherein a second GI slot, of the multiple GI slots, is associated with one of a truncated portion or a removed portion such that a boundary of the second GI slot aligns with a boundary of a second CP slot, of the multiple CP slots.

Aspect 17: The method of Aspect 16, wherein the CP frame structure and the GI frame structure are associated with an FFT size of 4096 samples, wherein a length of the extra portion is $32*2\mu-64$ samples with $\mu$ being associated with a numerology used for transmission, and wherein a length of the one of the truncated portion or the removed portion is 4032 samples.

Aspect 18: The method of any of Aspects 16-17, wherein the first GI slot is a first-in-time slot of the half subframe, and wherein the second GI slot is a second-in-time or later slot of the half subframe.

Aspect 19: The method of any of Aspects 15-18, wherein the first GI slot is associated with the removed portion, and wherein the removed portion is associated with a removed last-in-time symbol of the first GI slot.

Aspect 20: The method of any of Aspects 15-19, wherein the one of the extra portion, the truncated portion, or the removed portion is associated with a gap between the first GI slot and a second GI slot, of the multiple GI slots.

Aspect 21: The method of any of Aspects 15-20, wherein the one of the extra portion, the truncated portion, or the removed portion is associated with samples in a time domain that are not associated with an OFDM symbol.

Aspect 22: The method of any of Aspects 15-20, wherein the one of the extra portion, the truncated portion, or the removed portion is associated with a zero-tailed OFDM symbol.

Aspect 23: The method of any of Aspects 15-20, further comprising transmitting or receiving a second message, later-in-time to the first message, in the half subframe via the CP-based waveform using the first CP slot, wherein the first GI slot is associated with the extra portion such that the second message begins at the boundary of the first CP slot.

Aspect 24: The method of Aspect 23, wherein the first message is further transmitted or received in a second GI slot, of the multiple GI slots, occurring prior-in-time to the first GI slot, and wherein the second GI slot is not associated with an extra portion, a truncated portion, or a removed portion.

Aspect 25: The method of any of Aspects 23-24, wherein the CP frame structure and the GI frame structure are associated with an FFT size of 4096 samples, and wherein a length of the extra portion is $32*2\mu-64(k+1)$ samples with $\mu$ being associated with a numerology used for transmission and k corresponding to a slot index of the first GI slot.

Aspect 26: The method of any of Aspects 15-25, further comprising transmitting or receiving a second message, prior-in-time to the first message, in the half subframe via the CP-based waveform using the first CP slot, wherein the first GI slot is associated with one of the truncated portion or the removed portion such that the first message begins at the boundary of the first GI slot.

Aspect 27: The method of Aspect 26, wherein the first message is further transmitted or received in a second GI slot, of the multiple GI slots, occurring later-in-time to the first GI slot, and wherein the second GI slot is not associated with an extra portion, a truncated portion, or a removed portion.

Aspect 28: The method of any of Aspects 26-27, wherein the CP frame structure and the GI frame structure are associated with an FFT size of 4096 samples, and wherein a length of the one of the truncated portion or the removed portion is $32*2\mu-64(k+1)$ samples with $\mu$ being associated with a numerology used for transmission and k corresponding to a slot index of a slot immediately preceding the first GI slot.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive, from a network entity, a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and
      transmit or receive a first message in the half subframe via the GI-based waveform using the first GI slot.

2. The apparatus of claim 1, wherein the first GI slot is associated with the extra portion, and wherein a second GI slot, of the multiple GI slots, is associated with one of a truncated portion or a removed portion such that a boundary of the second GI slot aligns with a boundary of a second CP slot, of the multiple CP slots.

3. The apparatus of claim 2, wherein the CP frame structure and the GI frame structure are associated with a Fast Fourier Transform (FFT) size of 4096 samples, wherein a length of the extra portion is $32*2\mu-64$ samples with $\mu$ being associated with a numerology used for transmission, and wherein a length of the one of the truncated portion or the removed portion is 4032 samples.

4. The apparatus of claim 2, wherein the first GI slot is a first-in-time slot of the half subframe, and wherein the second GI slot is a second-in-time or later slot of the half subframe.

5. The apparatus of claim 1, wherein the first GI slot is associated with the removed portion, and wherein the removed portion is associated with a removed last-in-time symbol of the first GI slot.

6. The apparatus of claim 1, wherein the one of the extra portion, the truncated portion, or the removed portion is associated with a gap between the first GI slot and a second GI slot, of the multiple GI slots.

7. The apparatus of claim 1, wherein the one of the extra portion, the truncated portion, or the removed portion is associated with samples in a time domain that are not associated with an orthogonal frequency division multiplexing (OFDM) symbol.

8. The apparatus of claim 1, wherein the one of the extra portion, the truncated portion, or the removed portion is associated with a zero-tailed orthogonal frequency division multiplexing (OFDM) symbol.

9. The apparatus of claim 1, wherein the one or more processors are further configured to transmit or receive a second message, later-in-time to the first message, in the half subframe via the CP-based waveform using the first CP slot, wherein the first GI slot is associated with the extra portion such that the second message begins at the boundary of the first CP slot.

10. The apparatus of claim 9, wherein the first message is further transmitted or received in a second GI slot, of the multiple GI slots, occurring prior-in-time to the first GI slot, and wherein the second GI slot is not associated with an extra portion, a truncated portion, or a removed portion.

11. The apparatus of claim 9, wherein the CP frame structure and the GI frame structure are associated with a Fast Fourier Transform (FFT) size of 4096 samples, and wherein a length of the extra portion is $32*2\mu-64(k+1)$ samples with $\mu$ being associated with a numerology used for transmission and k corresponding to a slot index of the first GI slot.

12. The apparatus of claim 1, wherein the one or more processors are further configured to transmit or receive a second message, prior-in-time to the first message, in the half subframe via the CP-based waveform using the first CP slot, wherein the first GI slot is associated with one of the truncated portion or the removed portion such that the first message begins at the boundary of the first GI slot.

13. The apparatus of claim 12, wherein the first message is further transmitted or received in a second GI slot, of the multiple GI slots, occurring later-in-time to the first GI slot, and wherein the second GI slot is not associated with an extra portion, a truncated portion, or a removed portion.

14. The apparatus of claim 12, wherein the CP frame structure and the GI frame structure are associated with a Fast Fourier Transform (FFT) size of 4096 samples, and wherein a length of the one of the truncated portion or the removed portion is $32*2\mu-64(k+1)$ samples with $\mu$ being associated with a numerology used for transmission and k corresponding to a slot index of a slot immediately preceding the first GI slot.

15. An apparatus for wireless communication at a network entity, comprising:
a memory; and
one or more processors, coupled to the memory, configured to:
transmit, to a user equipment (UE), a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and
transmit or receive a first message in the half subframe via the GI-based waveform using the first GI slot.

16. The apparatus of claim 15, wherein the first GI slot is associated with the extra portion, and wherein a second GI slot, of the multiple GI slots, is associated with one of a truncated portion or a removed portion such that a boundary of the second GI slot aligns with a boundary of a second CP slot, of the multiple CP slots.

17. The apparatus of claim 16, wherein the CP frame structure and the GI frame structure are associated with a Fast Fourier Transform (FFT) size of 4096 samples, wherein a length of the extra portion is $32*2\mu-64$ samples with $\mu$ being associated with a numerology used for transmission, and wherein a length of the one of the truncated portion or the removed portion is 4032 samples.

18. The apparatus of claim 16, wherein the first GI slot is a first-in-time slot of the half subframe, and wherein the second GI slot is a second-in-time or later slot of the half subframe.

19. The apparatus of claim 15, wherein the first GI slot is associated with the removed portion, and wherein the removed portion is associated with a removed last-in-time symbol of the first GI slot.

20. The apparatus of claim 15, wherein the one of the extra portion, the truncated portion, or the removed portion is associated with a gap between the first GI slot and a second GI slot, of the multiple GI slots.

21. The apparatus of claim 15, wherein the one of the extra portion, the truncated portion, or the removed portion is associated with samples in a time domain that are not associated with an orthogonal frequency division multiplexing (OFDM) symbol.

22. The apparatus of claim 15, wherein the one of the extra portion, the truncated portion, or the removed portion is associated with a zero-tailed orthogonal frequency division multiplexing (OFDM) symbol.

23. The apparatus of claim 15, wherein the one or more processors are further configured to transmit or receive a second message, later-in-time to the first message, in the half subframe via the CP-based waveform using the first CP slot, wherein the first GI slot is associated with the extra portion such that the second message begins at the boundary of the first CP slot.

24. The apparatus of claim 23, wherein the first message is further transmitted or received in a second GI slot, of the multiple GI slots, occurring prior-in-time to the first GI slot, and wherein the second GI slot is not associated with an extra portion, a truncated portion, or a removed portion.

25. The apparatus of claim 15, wherein the one or more processors are further configured to transmit or receive a second message, prior-in-time to the first message, in the half subframe via the CP-based waveform using the first CP slot, wherein the first GI slot is associated with one of the truncated portion or the removed portion such that the first message begins at the boundary of the first GI slot.

26. The network entity of claim 25, wherein the first message is further transmitted or received in a second GI slot, of the multiple GI slots, occurring later-in-time to the first GI slot, and wherein the second GI slot is not associated with an extra portion, a truncated portion, or a removed portion.

27. A method of wireless communication performed by a user equipment (UE), comprising:
receiving, from a network entity, a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and
transmitting or receiving a first message in the half subframe via the GI-based waveform using the first GI slot.

28. The method of claim 27, wherein the first GI slot is associated with the extra portion, and wherein a second GI slot, of the multiple GI slots, is associated with one of a truncated portion or a removed portion such that a boundary of the second GI slot aligns with a boundary of a second CP slot, of the multiple CP slots.

29. A method of wireless communication performed by a network entity, comprising:
- transmitting, to a user equipment (UE), a configuration of a cyclic prefix (CP) frame structure associated with a CP-based waveform and a guard interval (GI) frame structure associated with a GI-based waveform, wherein the CP frame structure includes multiple CP slots arranged in a half subframe, wherein the GI frame structure includes multiple GI slots arranged in the half subframe, and wherein a first GI slot, of the multiple GI slots, is associated with one of an extra portion, a truncated portion, or a removed portion such that a boundary of the first GI slot aligns with a boundary of a first CP slot, of the multiple CP slots; and
- transmitting or receiving a first message in the half subframe via the GI-based waveform using the first GI slot.

30. The method of claim 29, further comprising transmitting or receiving a second message, later-in-time to the first message, in the half subframe via the CP-based waveform using the first CP slot, wherein the first GI slot is associated with the extra portion such that the second message begins at the boundary of the first CP slot.

* * * * *